United States Patent [19]

Kaneko et al.

[11] Patent Number: 5,777,700
[45] Date of Patent: Jul. 7, 1998

[54] LIQUID CRYSTAL DISPLAY WITH IMPROVED VIEWING ANGLE DEPENDENCE

[75] Inventors: Setsuo Kaneko; Ken Sumiyoshi; Yoriko Hatada, all of Tokyo, Japan

[73] Assignee: NEC Corporation, Tokyo, Japan

[21] Appl. No.: 696,100

[22] Filed: Aug. 14, 1996

Related U.S. Application Data

[63] Continuation of Ser. No. 273,123, Jul. 14, 1994, abandoned.

[30] Foreign Application Priority Data

Jul. 14, 1993 [JP] Japan .................................. 5-174529
Jul. 14, 1993 [JP] Japan .................................. 5-174531

[51] Int. Cl.$^6$ .......................... G02F 1/133; G02F 1/1343
[52] U.S. Cl. ............................ 349/39; 349/129; 349/144
[58] Field of Search .................................. 359/59, 87, 38, 359/39, 139, 144, 129

[56] References Cited

U.S. PATENT DOCUMENTS

| 4,840,460 | 6/1989 | Bernot et al. | 359/59 |
|---|---|---|---|
| 5,126,865 | 6/1992 | Sarma | 359/59 |
| 5,245,450 | 9/1993 | Ukai et al. | 359/59 |
| 5,289,074 | 2/1994 | Suzuki | 345/98 |
| 5,319,480 | 6/1994 | McCartney | 359/87 |
| 5,404,236 | 4/1995 | Hartmann et al. | 359/87 |

FOREIGN PATENT DOCUMENTS

| 63-106624 | 5/1988 | Japan . | |
|---|---|---|---|
| 64-88520 | 4/1989 | Japan . | |
| 1-182828 | 7/1989 | Japan | 359/87 |
| 1-245223 | 9/1989 | Japan . | |
| 2-12 | 1/1990 | Japan . | |
| 2-310534 | 12/1990 | Japan . | |
| 3-122621 | 5/1991 | Japan . | |
| 4-366813 | 12/1992 | Japan . | |
| 5-107556 | 4/1993 | Japan | 359/87 |

OTHER PUBLICATIONS

K. H. Yang. "Two–Domain Twisted Nematic And Tilted Homoeotropic Liquid Crystal Displays For Active Matrix Applications", IBM Research Divisoin, T. J. Watson Research Center, P.O. Box 704, Yorktown Heights, NY 10598, 1991 IEEE.

(List continued on next page.)

*Primary Examiner*—Hung X. Dang
*Assistant Examiner*—Kenneth Parker
*Attorney, Agent, or Firm*—Foley & Lardner

[57] ABSTRACT

A liquid crystal display having satisfactory visibility in a wide viewing angle range is provided. A TFT array substrate of the liquid crystal display includes scanning electrodes and signal electrodes arranged in a matrix shape, thin-film transistors respectively disposed at intersections between the scanning electrodes and the signal electrodes, first pixel electrodes respectively connected to the signal electrodes via the thin-film transistors, connecting capacitor electrodes formed in a layer including gate electrodes of the thin-film transistors, and second pixel electrodes capacitively connected to the first pixel electrodes via the connecting capacitor electrodes. It is not necessary to use any additional process to form the second electrodes, leading to advantages that the product yield is improved and production cost is lowered. Each pixel is divided into plural areas having different directions of orientation and into plural areas being applied with different voltages. Due to existence of the areas having different directions of orientation, there is attained a vertically symmetric transmittivity characteristic. Moreover, adjusting the surface ratio and the application voltage ratio between the areas to be applied with different voltages, there are attained an advantageous effect that viewing angle dependence is relaxed in the low gradation presentation and visibility is improved.

10 Claims, 42 Drawing Sheets

OTHER PUBLICATIONS

Y. Koike, T. Kamanda, K. Okamoto, M. Ohashi, I. Tomita, M. Okabe, Fujitsu Ltd., Atsugi, Japan, 41.5: Late–News Paper: A Full–Color TFT–LCD With A Domain–Divided Twisted–Nematic Structure, 798 SID 92 Digest.

K. Takatori, K. Sumiyoshi, Y. Hirai, S. Kaneko, NEC Corporation, Kawasaki, Kanagawa, Japan, "S15–6: A Complementary TN LCD With Wide–Viewing–Angle Grayscale", Japan Display '92.

Kalluri R. Sarma, Henry Franklin, Mike Johnson, Keith Frost, Anthony Bernot, Phoenix Technology Center, Honeywell, Inc., Phoenix, AZ, "10.2: Active–Matrix LCSs Using Gray–Scale In Halftone Methods", SID 89 Digest.

T. Sunata, T. Inada, T. Nakagawa, Y. Matsushita, Y. Ugai, S. Aoki, Hosiden Corporation, 3–1, Takatsukadai, 4–Chome, Nishi–ku, Kobe–City, Hyogo, 651–22, Japan, "A Wide–Viewing–Angle 10–Inch Diagnal Full–Color Active–Matrix LCD Using A Halftone–Grayscale Method", 1991 IEEE.

FIG. 8
PRIOR ART
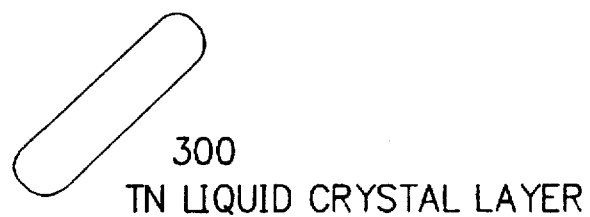
300
TN LIQUID CRYSTAL LAYER
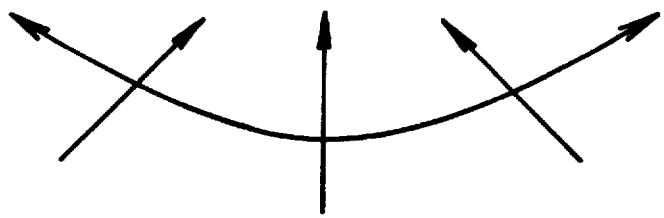
300 EYE
FIG. 9
PRIOR ART
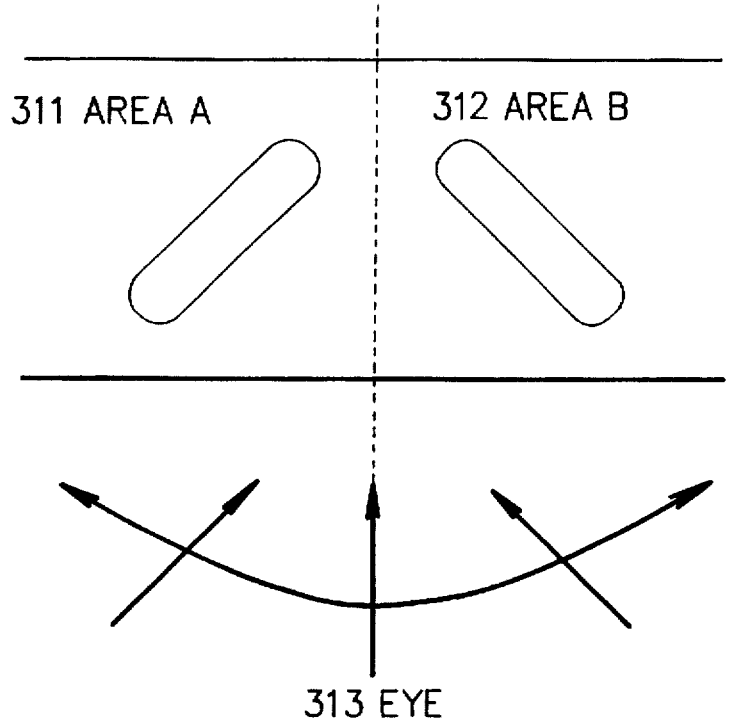
311 AREA A    312 AREA B
313 EYE F I G. 14
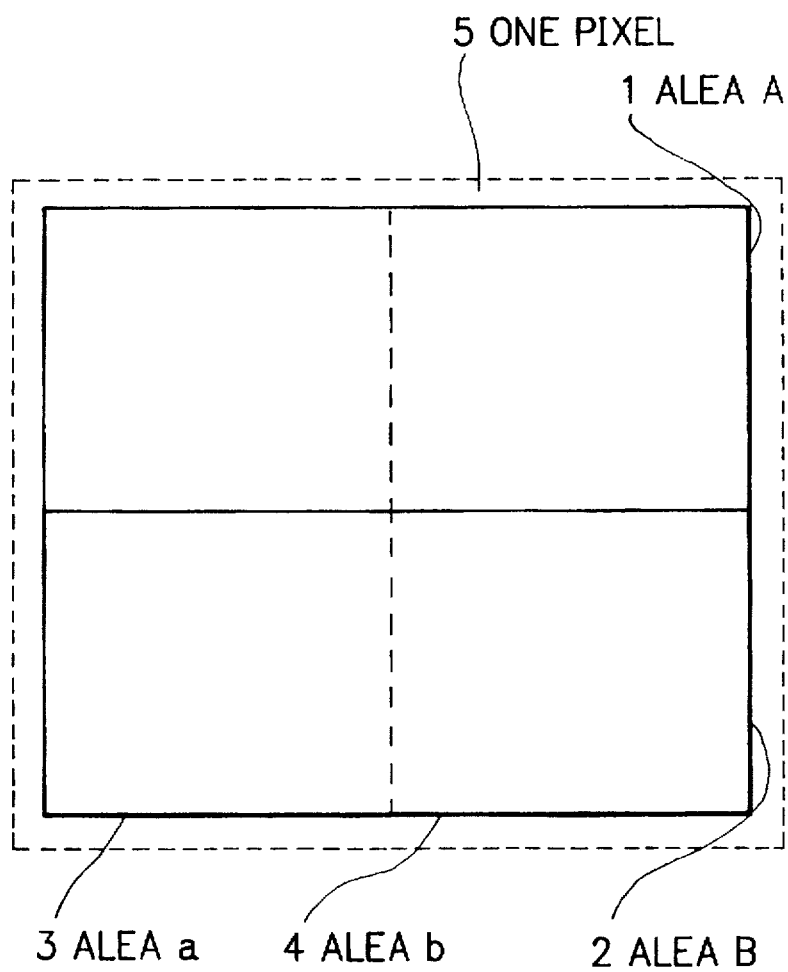

F I G. 35
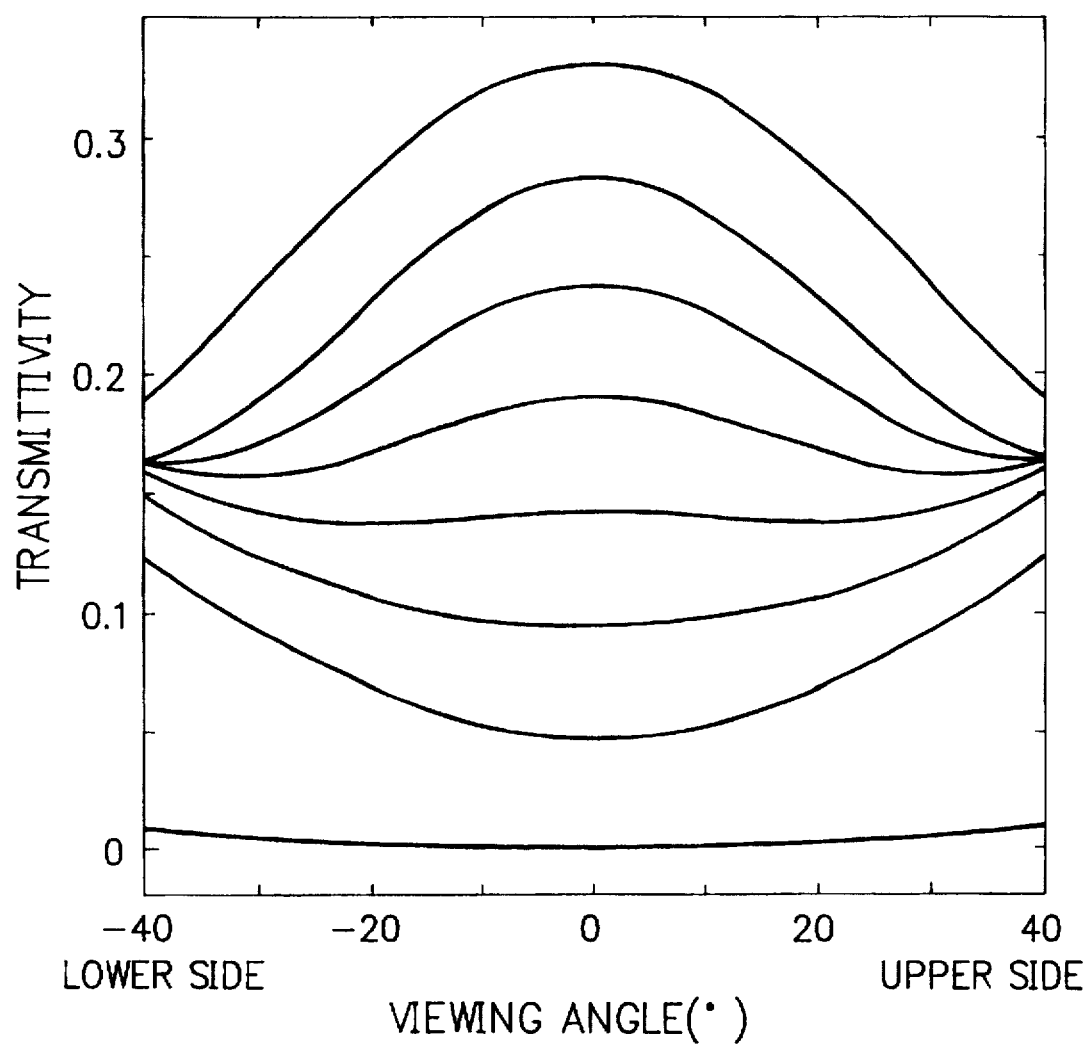

170 LIQUID CRYSTAL ORIENTATION AREA A
171 LIQUID CRYSTAL ORIENTATION AREA B

F I G. 40
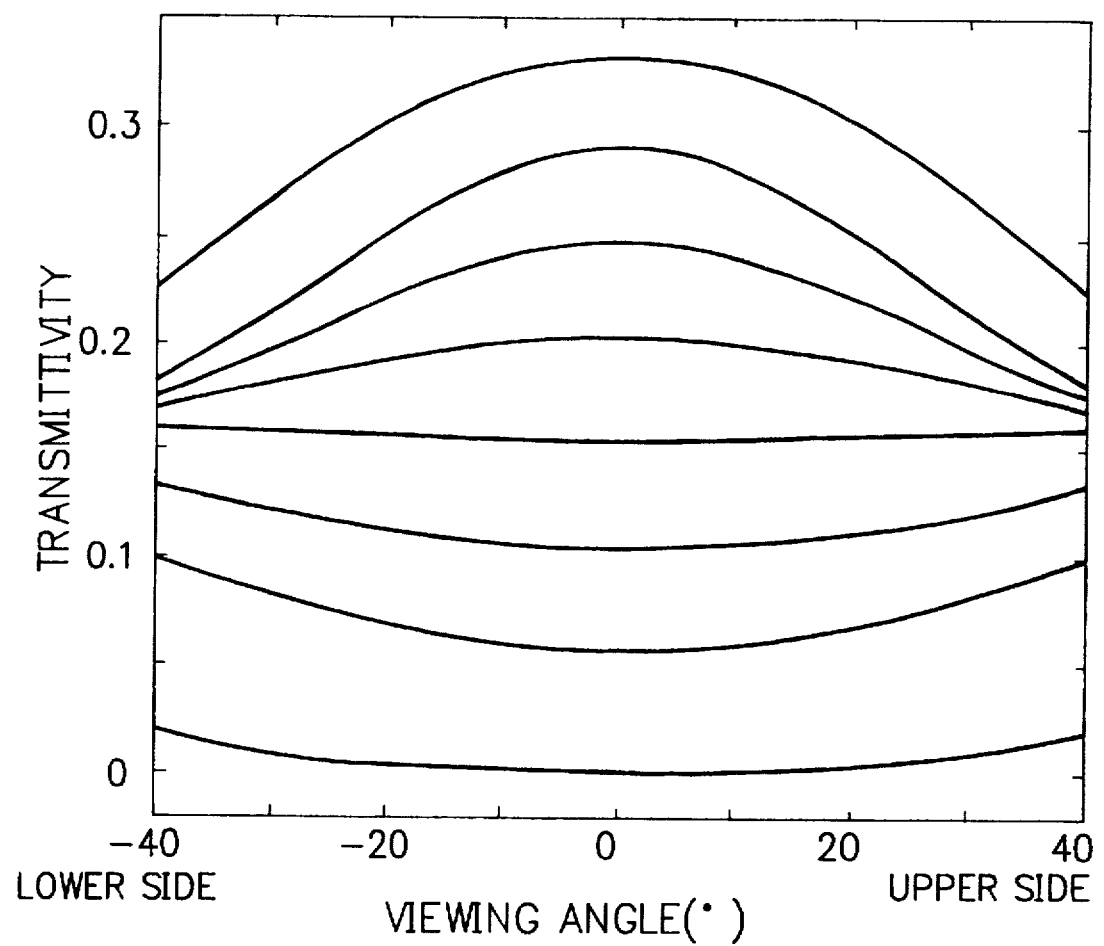

LIQUID CRYSTAL DISPLAY WITH IMPROVED VIEWING ANGLE DEPENDENCE

This is a file wrapper continuation of U.S. patent application Ser. No. 08/273,123, filed Jul. 14, 1994, now abandoned.

BACKGROUND OF THE INVENTION

The present invention relates to a liquid crystal display for use with a computer, a television set, or the like.

DESCRIPTION OF THE PRIOR ART

In a liquid crystal display, a liquid crystal layer having a thickness of about 5 micrometers (μm) is interposed between two glass plates respectively connected to X and Y electrodes such that behavior of molecules of liquid crystal are controlled by a voltage applied across the X and Y electrodes. Consequently, the thickness or depth of the liquid crystal display can be considerably reduced when compared with that of the cathode-ray tubes (CRTs).

In an XY matrix (timeshared) drive of liquid crystal, for example, when the number of scanning lines becomes greater like in a personal computer, a word processor, or the like, the discrepancy between the effective voltages respectively applied to a (selected) pixel to be driven for display and a (non-selected) pixel not to be driven is reduced. This consequently leads to a problem of a low contrast in the displayed image. As a method of removing the problem of low contrast and of thereby implementing a high scanning line (large capacity) display, there has been developed an active matrix drive method using thin-film transistors.

FIGS. 1A and 1B respectively show a plan view and a cross-sectional view of a thin-film transistor array of a conventional liquid crystal display.

As can be seen from these diagrams, the conventional system includes a substrate 910, a pixel electrode 904, a gate electrode as part of a scanning electrode 911, and source and drain electrodes either as part of a signal electrode 912 and the other 913 connected to the pixel electrode 904, as it is composed of a first pixel electrode 914 in FIG. 1B.

In FIGS. 1A and 1B, designated by reference character 917 is a storage capacitor electrode, 918 is a gate insulating layer, and 1069 is a semiconductor film.

When using thin-film transistors in a liquid crystal display, it is necessary to fabricate a thin-film transistor array at a low cost with a high production yield. On the other hand, in applications of thin-film transistors to a display having a large screen, a display to be installed in a car, and the like, there has long been desired advent of a display having satisfactory viewing angle dependence. However, the liquid crystal display is inherently attended with viewing angle dependence as shown in FIG. 2. The viewing angle characteristic is particularly narrow in the vertical direction (horizontally shown in the graph of FIG. 2). A contrast of 5:1 or more can be guaranteed without inversion of gradations 1–8 only in a viewing angle range of 30°. This confines liquid crystal displays in a narrow application range. Consequently, it has been necessitated to develop a low-cost display without such a viewing angle dependence. Particularly, as the size of liquid crystal displays becomes larger and the application field thereof are expanded and hence, for example, such displays are increasingly utilized in automobiles, the viewing angle dependence is an essential problem to be solved.

As a method of improving viewing angle dependence, there has been proposed a method in which each pixel is subdivided into two or three regions such that liquid crystal zones associated therewith are applied with mutually different voltages. Reference is to be made to such articles as International Display Research Conference, 1991 (T. Sunata et al. p. 255), Japanese Patent Laid-Open Publication No. 2-310534, Japanese Patent Laid-Open Publication No. 4-366813, Japanese Patent Laid-Open Publication No. 2-12, and Japanese Patent Laid-Open Publication No. 3-122621. The method is used in an active matrix liquid crystal display including, as can be seen from FIG. 3 showing the device plan view of the display associated with the method, a thin-film transistor array in which scanning electrodes 831 and signal electrodes 832 are arranged in a matrix shape, and each transistor has a gate electrode and one of source and drain electrodes thereof connected to corresponding scanning and electrodes 831 and 832, near a cross point therebetween, and the other 833 of the source and drain electrodes connected to a first pixel electrode 834. The method includes the following steps of forming a TFT array substrate including the first pixel electrodes 834 and second pixel electrodes 835 capacitively connected thereto and changing a magnitude of a voltage applied to each pixel electrode, thereby varying a magnitude of voltage applied to a liquid crystal zone or area related to the pertinent pixel electrode. Resultantly, the signal voltage and the connecting capacitance can be set such that the liquid crystal zones on the first pixel electrodes are applied with a voltage of halftone display and the liquid crystal zones on the second pixel electrodes are applied with a voltage equal to or less than a threshold voltage. In this situation, in the operation of the liquid crystal devices, the viewing angle characteristic of the liquid crystal applied with the voltage equal to or less than the threshold voltage is relatively satisfactory. Consequently, in each liquid crystal in the zones on the first and second pixel electrodes, there is attained a viewing angle characteristic corresponding to the voltage applied to the liquid crystal area. In total, there is obtained a characteristic in which the respective characteristics are superimposed onto each other. Consequently, there is resultantly obtained a display device having a relatively good viewing angle characteristic also for halftone presentation.

As another method of improving the viewing angle dependence has been described, for example, in page 148 of the "Active-Matrix Method", 1989 SID International symposium digest of technical papers, Vol. 20; Japanese Patent Laid-Open Publication No. 2-12, or Japanese Patent Laid-Open Publication No. 3-122621. According to the method, each pixel is divided into three regions such that mutually different voltages are applied to liquid crystal of the respective regions. As shown in FIG. 4, for a thin-film transistor 260, there are inserted capacitors $C_{C2}$ and $C_{C3}$ to apply mutually different voltages to liquid crystal capacitors $C_{LC1}$, $C_{LC2}$, and $C_{LC3}$, of the respective subdivided regions A, B, and C. G is a gate electrode and S is a source electrode.

In this structure, there is used a liquid crystal display mode called a twisted nematic phase. FIG. 5 shows a characteristic of transmittivity with respect to voltage in the twisted nematic mode. In the transmittivity vs. voltage characteristic, the viewing angle dependence is relatively relaxed in voltage ranges X and Y. When a pixel electrode 281 is partitioned into three areas A, B, and C as shown in FIG. 6 for a thin-film transistor 280 and voltage is divided by capacitors, the transmittivity vs. voltage characteristic of each area will be as shown in FIG. 7. If voltage V1 is applied to the electrodes, although viewing angle dependence is deteriorated in the area A, the viewing angle dependence is still relaxed in the areas B and C. Consequently, the viewing angle dependence is relaxed for the overall pixel as shown in FIG. 7. In addition, when voltage V2 is applied thereto, viewing angle dependence is deteriorated in the area B; however, the viewing angle dependence is still in a relaxed state in the areas A and C, and consequently a relaxed viewing angle dependence is developed for the overall pixel. The similar phenomenon takes place also when voltage V3 is applied to the electrodes. In this fashion, the viewing angle range can be expanded by using the voltage ranges related to relaxed viewing angle dependence shown in FIG. 5.

There has also been adopted a method in which each pixel is divided into two areas of TN liquid crystal such that the two areas are different from each other in orientation by 180° so as to minimize discrepancy of viewing angle anisotropy particularly between an upper position and a lower position, thereby preventing inversion of gradation. Reference is to be made to such materials as K. H. Yang, International Display Research Conference, p68, 1991; Y. Koike et al. Society for Information Display, p798, 1992; K. Takatori et al., Japan Display, p591, 1992; Japanese Patent Laid-Open Publication No. 63-106624, Japanese Patent Laid-Open Publication No. 1-88520, or Japanese Patent Laid-Open Publication No. 1-245223. The principle of the method will be described by reference to FIGS. 8 and 9. Viewing the display screen from the front side thereof, the viewing angle dependence of the liquid crystal display takes a largest value in the viewing angle in a rising direction of liquid crystal when the liquid crystal is applied with a voltage. Since the direction of orientation of liquid crystal is ordinarily selected to increase the viewing angle range in the horizontal direction of the display screen, the direction of azimuth of large viewing angle dependence is set to the vertical direction. The horizontal direction of FIG. 8 is associated with the vertical direction of the display screen. When the eye or the viewing position is moved toward the left, anisotropy of the refractive index of liquid crystal is reduced; whereas, when the viewing position is moved toward the right, anisotropy of the refractive index of liquid crystal is increased. Consequently, the optical characteristic varies when the viewing direction or position is horizontally varied. To overcome this difficulty, each pixel includes two areas, i.e., area "a" 311 and area "b" 312, having respectively different directions of liquid crystal orientation. Namely, when a voltage is applied to the electrode, liquid crystal of the area a is activated in a direction opposite to a direction in which liquid crystal of the area b is activated. In this situation, when the viewing position is moved toward the left, although anisotropy of the refractive index of liquid crystal in the area a 311 is minimized, anisotropy of the refractive index of liquid crystal in the area b 312 is increased. When the viewing position is moved toward the right, although anisotropy of the refractive index of liquid crystal in the area a 311 is increased, anisotropy of the refractive index of liquid crystal in the area b 312 is decreased. As above, in each pixel, the variation in anisotropy is smoothed for the overall pixel. Consequently, even when the viewing point is moved to the right or left (along the vertical direction in the display screen), there is obtained a reduced changed in anisotropy of the refractive index, thereby relaxing the viewing angle dependence. Subdividing each pixel according to directions of orientation as described above, it is possible to mitigate the viewing angle dependence in the vertical direction of the display screen.

FIG. 10 illustratively shows the structure of a conventional liquid crystal display. As can be seen from this diagram, the display includes a TFT substrate 353, and a scanning electrode 356, a signal electrode 357, a thin-film transistor 352, a first pixel electrode 354, a second pixel electrode 358, and an insulator film 351 for connecting capacitance, which are formed on the TFT substrate 353, and an opposing substrate 355.

However, to form the pixel electrode structure of FIG. 3, it is necessary that after forming the first pixel electrode 834 connected to the TFT, an insulator film for connecting capacitance and the second pixel electrode 835 are fabricated in this order, which increases the number of processes to manufacture the insulation film and the second pixel electrode. This leads to essential problems of manufacturing liquid crystal displays, namely, the production yield decreased and the production cost is increased. The conventional structure shown in FIG. 4 is attended with the following problem.

Although the conventional example described above is effective in a binary display operation, there cannot be obtained a satisfactory performance in a gradation (halftone) display. FIG. 11 is a graph showing variation in transmittivity with respect to change of the viewing angle (transmittivity=50%), which applies to the halftone display operation (pages 255 to 257 of "a wide-viewing-angle 10-inch-diagonal full color active-matrix LCD using a halftone-grayscale method", 1991, IDRC). As shown in FIG. 11, permittivity of TN liquid crystal is considerably altered with respect to change in the vertical direction on the display screen. This is because that the voltage range Y of FIG. 5 is associated with viewing angle dependence which is relatively smooth. This method is accordingly attended with a problem that a higher voltage is required to be applied to the electrode to further relax the viewing angle dependence in the voltage range Y of FIG. 5. As can be seen from FIG. 11, for an identical viewing angle change, transmittivity varies differently depending on colors. This also leads to a problem that even a pixel representing white may be visually received, when viewed from the front side, as a colored pixel when the viewing position is tilted.

As shown in FIG. 12, there exists still a problem that according to the characteristic between the viewing angle in 8-gradation display operation and transmittivity, inversion of transmittivity takes place between first and second gradation levels when the viewing angle change is about 10°.

In the example of FIG. 6, although inversion of gradation can be suppressed from the viewing angle change in the vertical direction, there arises a problem that visibility is lowered as the viewing point is moved. This phenomenon will be described by reference to FIG. 13 showing a change in transmittivity with respect to the viewing angle. As shown in FIG. 13, when the viewing angle is changed toward a vertical direction, transmittivity of a low gradation presentation is likely to increase and that of a high gradation presentation is likely to decrease. In consequence, the transmittivity ratio between gradation levels at viewing angle 0° (viewed from the front side) is decreased as the viewing point is tilted, thereby deteriorating visibility. That is, the method is attended with a problem that visibility is lowered when the viewing point is moved.

SUMMARY OF THE INVENTION

It is therefore an object of the present invention to provide a liquid crystal display capable of improving the viewing angle range and having a simplified constitution manufactured through a small number of processes.

In accordance with a first aspect of the present invention, to capacitively connect a first pixel electrode to a second pixel electrode, there is formed a connecting capacitor electrode in a layer including a gate electrode, a scanning electrode, or a storage capacitor electrode, thereby capacitively connecting the first pixel electrode to the second pixel electrode by the connecting capacitor electrode.

Moreover, a plurality of pixel electrodes can be capacitively connected to each other by a plurality of connecting capacitor electrodes.

That is, in a liquid crystal display including scanning electrodes and signal electrodes formed in a matrix shape on a transparent substrate, thin-film transistors respectively arranged at intersection points or crosspoints between the scanning and signal electrodes, first pixel electrodes connected via the associated thin-film transistors respectively to the signal electrodes, an opposing electrode opposing the pixel electrodes, and a liquid crystal layer interposed between the first pixel electrodes and the opposing electrode, there are arranged connecting capacitor electrodes formed in a layer including the gate electrodes, the scanning electrodes, or storage capacitor electrodes respectively related to the thin-film transistors and at least one pixel electrode capacitively connected to the first pixel electrodes by the connecting capacitor electrodes.

Alternatively, a second pixel electrodes are formed in a layer including the gate electrodes, the scanning electrodes, or storage capacitor electrodes of the thin-film transistors, the second pixel electrodes being capacitively connected to the first pixel electrodes, respectively.

In other words, in a liquid crystal display including scanning electrodes and signal electrodes formed in a matrix shape on a transparent substrate, thin-film transistors respectively arranged at intersection points between the scanning and signal electrodes, first pixel electrodes connected via the associated thin-film transistors respectively to the signal electrodes, an opposing electrode opposing the pixel electrodes, and a liquid crystal layer interposed between the first pixel electrodes and the opposing electrode, there is arranged at least one pixel electrode formed in a layer including the gate electrodes, the scanning electrodes, or storage capacitor electrodes respectively related to the thin-film transistors, the pixel electrode being capacitively connected to the first pixel electrodes.

In accordance with a second aspect of the present invention, each display pixel is subdivided into n areas (n is a natural number not less than two) respectively having different directions of liquid crystal orientation and into m areas (m is a natural number not less than two) respectively being associated with different voltages to be applied to liquid crystal thereof, the pixel resultantly including n×m areas related to the combinations of n and m.

In accordance with a third aspect of the present invention, each display pixel is divided into m areas (m is a natural number not less than two) respectively being associated with different voltages to be applied to liquid crystal thereof and the overall display substrate is subdivided into n areas (n is a natural number not less than two) respectively having different directions of liquid crystal orientation.

As the transparent insulator substrate, there can be employed a glass plate or the like.

To fabricate the scanning electrodes, signal electrodes, gate electrodes, storage capacitor electrodes, and connecting capacitor electrodes, there have been commonly used metals such as Cr, Ta, Al, and TaN and alloys and stacked layers thereof.

For the pixel electrodes, there are ordinarily used transparent conductive layers made of ITO or the like.

The thin-film transistors may be amorphous silicon thin-film transistors of a channel etch type or channel protection film type or transistors made of other materials.

In accordance with the first aspect of the present invention, to capacitively connect the first and second pixel electrodes to each other, there are formed the connecting capacitor electrodes in the layer including the gate electrodes, the scanning electrodes, or storage capacitor electrodes respectively related to the thin-film transistors, thereby capacitively connecting the first pixel electrodes to the second pixel electrodes. Alternatively, the second pixel electrodes are formed in the layer including the gate electrodes, the scanning electrodes, or storage capacitor electrodes respectively related to the thin-film transistors so as to be capacitively connected to the first pixel electrodes. In consequence, when fabricating the second electrodes, no additional process is necessary, which leads to advantages of improvement of the production yield and reduction of the production cost.

Description will be given of the second aspect of the present invention. In this example, each display pixel is subdivided for simplification of description, into two TN liquid crystal areas, i.e., an area "a" and an area "b", respectively having different directions of orientation, the directions being shifted from each other by 180°. Moreover, the pixel is also subdivided into two areas, i.e., an area A and an area B, respectively associated with different voltages to be applied to liquid crystal thereof. However, the following description is also applicable to a case where the pixel is subdivided according to three or more directions of orientation and according to at least three different voltages to be applied to liquid crystal.

In this case, each pixel 5 includes 2×2=4 areas and is subdivided, for example, as shown in a plan view of FIG. 14. Since liquid crystal of area A 1 and liquid crystal of area B 2 are applied with mutually different voltages, like $V_1$ and $V_4$, and hence transmittivity with respect to the voltage applied to liquid crystal varies, like $T_1$ to $T_5$, between these areas as shown in FIG. 15. Since areas A 1 and B 2 respectively include area a 3 and area b 4 respectively having different directions of orientation, the directions being apart from each other by 180°. Consequently, when the viewing direction or point is altered, transmittivity varies as shown in a graph of FIG. 16. It can be understood from the graph that there exists transmittivity T3 which is invariant with respect to the viewing angle change when a voltage is applied to liquid crystal. In FIG. 15, transmittivity T3 corresponds to voltages V2 and V3 in the areas A and B, respectively. To take advantage of this fact, a surface area ratio between area A 1 and area B 2 is appropriately adjusted such that the overall pixel in the halftone or gradation presentation takes value T4 slightly greater than value T3 of area A 1. In this example, this can be achieved by reducing area A 1 relative to area B 2. With provision described above, in a display state of a lowest gradation (darkest state), the pixel is in a state where the viewing angle dependence is low in area A 1 and area B 2, which leads to low viewing angle dependence for the overall pixel. In the second halftone display state, areas A and B have transmittivity values T4 and T2, respectively. When the viewing position is moved or the viewing angle is altered, transmittivity increases and decreases in areas A and B, respectively. Consequently, averaging transmittivity values according to the surface area ratio between areas A and B, the entire pixel has transmittivity having low viewing angle dependence. FIG. 17 schematically shows dependence of transmittivity on the viewing angle. As can be seen from the graph, dependence of transmittivity on the viewing angle can be minimized in the low halftone presentation so as to remarkably improve visibility.

The second aspect of the present invention seems to be a simple combination including the conventional example. This is not true. In the conventional example, there are employed voltage ranges X and Y having low viewing angle dependence as shown in FIG. 5. On the other hand, the direction of orientation is altered for each area to obtain a new state developing low viewing angle dependence (transmittivity T3 of FIG. 16). Advantageously using the state, the liquid crystal display is fabricated in accordance with the present invention. This leads to considerably broad visibility which cannot be attained by the example of the prior art.

Subsequently, referring to FIG. 18, description will be given of a third aspect in accordance with the present invention. When displaying a landscape or the like, each pixel need not be necessarily subdivided according to directions of orientation. In the case of a landscape, it is rare that one pixel is adopted as the unit of presentation, namely, a set of several pixels is employed as the unit to create an image. Consequently, even when each pixel has not a symmetric optical characteristic in the vertical direction, a display image can be recognized only if a total of the pixel and adjacent pixels thereof has a symmetric optical characteristic in the vertical direction. For example, as shown in FIG. 18, each pixel 25 is subdivided into two types of areas A and B, and the direction of orientation is altered for every second pixel, i.e., in the unit of two pixels, namely, the orientation is changed between areas a and b. Also in this case, there is obtained a display image with an advantage similar to that of the second aspect of the present invention. The description has been given of one of the most simple cases. However, when the number of areas related to different directions of orientation as well as that of areas associated with different voltages are increased, the similar advantageous effect is obtained.

In the description, the liquid crystal is operated in the TN mode; however, the present invention is not limited to this example. Changing the direction of orientation for each area, the present invention can be applied also to almost all cases where there appears a transmittivity value such as T3 of FIG. 16 for which viewing angle dependence is almost suppressed. The similar advantage is also attained in other liquid crystal modes.

As described above, on each pixel electrode, there exist areas (e.g., 170 and 171 of FIG. 38A) having different directions of liquid crystal orientation. Consequently, the problem of the case where liquid crystal is driven by different voltages of pixel electrodes, namely, the gradation inversion in a high viewing angle does not take place. In addition, there does not occur reduction of contrast which appears when the viewing angle is increased as shown in FIG. 19 in a case where each pixel has only display areas having different directions of orientation. Resultantly, the viewing angle characteristic in the vertical direction is remarkably improved to provide a liquid crystal display having a satisfactory viewing characteristic in the vertical and horizontal directions.

BRIEF DESCRIPTION OF THE DRAWINGS

The objects and features of the present invention will become more apparent from the consideration of the following detailed description taken in conjunction with the accompanying drawings wherein:

FIG. 8 is a cross-sectional view useful to explain the conventional technology;

FIG. 9 is a cross-sectional view for explaining the prior art;

FIG. 14 is a plan view to explain a second invention;

FIG. 35 is a graph showing a viewing-angle-vs-transmittivity characteristic of the seventh embodiment of the second invention in which the pixel is not subdivided according to voltages;

FIG. 40 is a graph showing a viewing angle characteristic in 8-gradation presentation of a liquid crystal display in accordance with the first embodiment in accordance with the second invention;

DESCRIPTION OF THE PREFERRED EMBODIMENTS

Figure 1A:
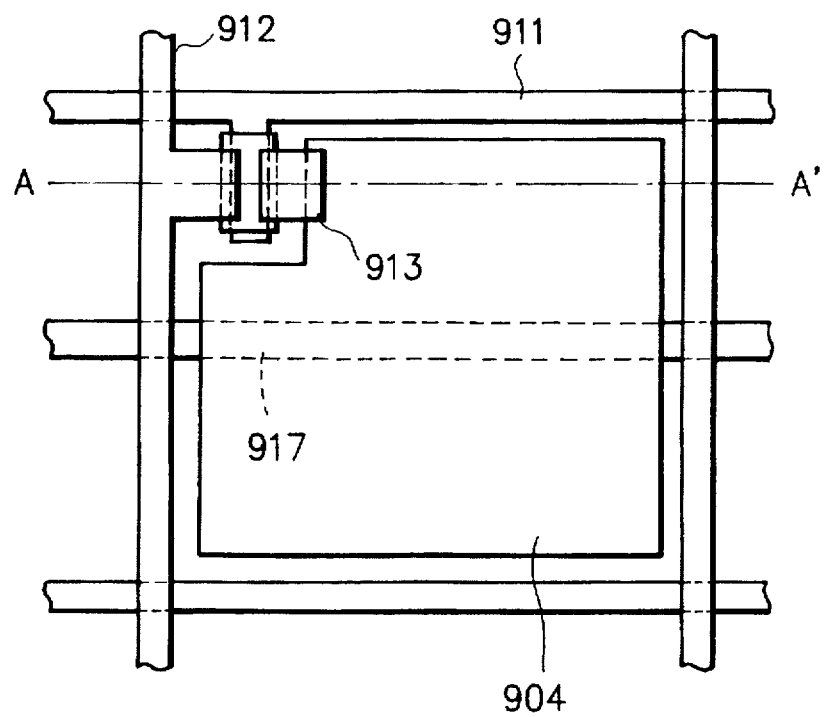
FIG. 1A is a plan view showing a thin-film transistor array of a conventional liquid crystal display.

Referring now to the drawings, description will be given of a first embodiment in accordance with a first invention.

Figure 20A:
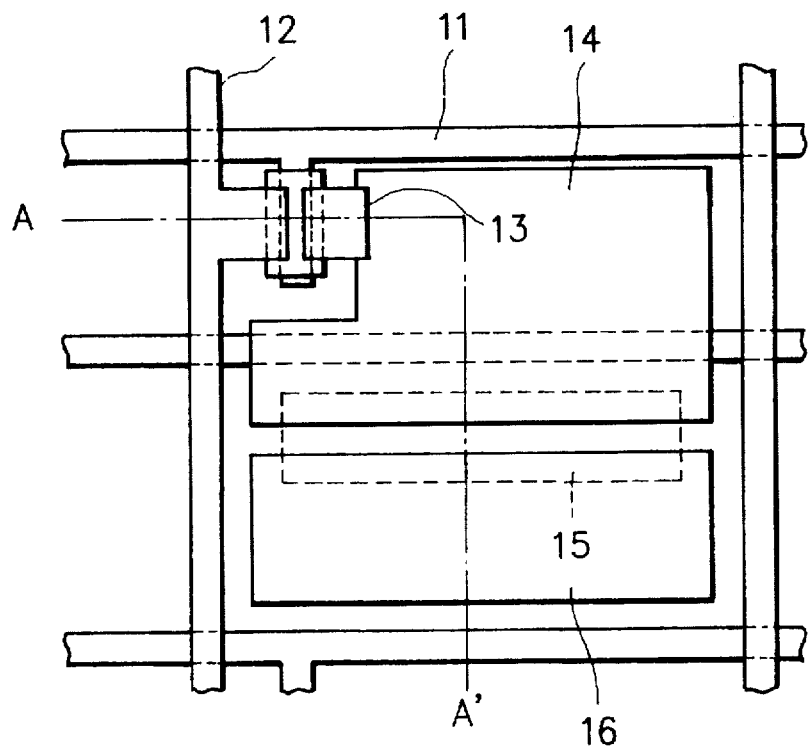
FIG. 20A is a plan view showing a thin-film transistor array of a liquid crystal display according to a first embodiment of the first invention.
Figure 20B:
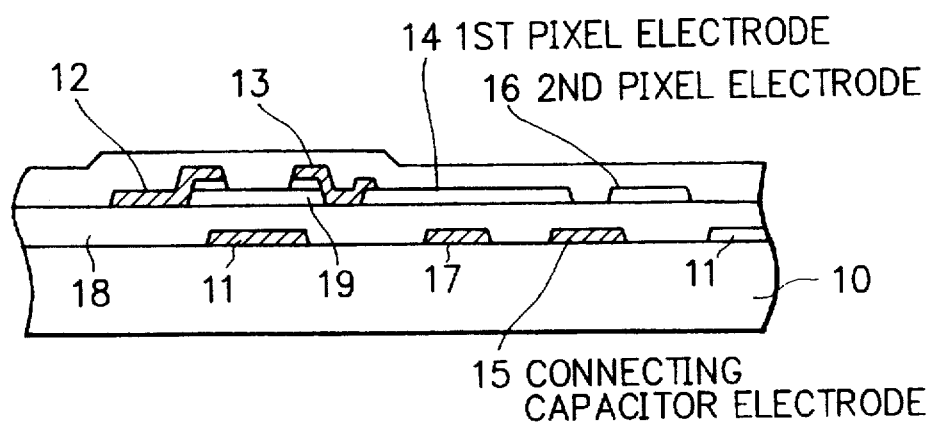
FIG. 20B is a cross-sectional view along line A–A' of FIG. 20A.

FIGS. 20A and 20B respectively show a plan view and a cross-sectional view along A-A' of a TFT array substrate of a liquid crystal display in the first embodiment in accordance with the first invention.

First, on a transparent glass plate 10, Cr is sputtered to form a Cr layer having a thickness of 1500 angstrom so as to fabricate scanning electrodes 11, gate electrodes integral with the scanning electrodes 11, connecting capacitor electrodes 15, and storage capacitor electrodes 17 in island structure as shown in these diagrams. There can also be considered a case not using the storage capacitor electrodes. The present invention is effective also in such a case. Subsequently, a gate insulator film 18 having a thickness of 500 angstrom and a 3000 angstrom thick amorphous Si film 19 are grown by plasma chemical vapor deposition (CVD) in island structure.

As materials of the metallic electrodes in this situation, there have been known, in addition to Cr, metals of Ta and A 1 and alloys and laminated films thereof. The present invention is effective for any one of these substances and items.

There is formed an amorphous Si film in island structure and then indium oxide tin is sputtered to form a transparent electrode layer so as to simultaneously form first and second pixel electrodes 14 and 16 in island structure. Areas respectively of the first and second pixel electrodes vary depending on liquid crystal display mode. In the normally black mode, the area of the first pixel electrode is set to be equal to twice that of the second pixel electrode. In the normally white mode, the area of the first pixel electrode is set to be equal to half that of the second pixel electrode. Subsequently, a 1500 angstrom thick Cr film is formed by sputtering so as to fabricate signal electrodes 12, source electrodes integral with the signal electrodes 12, and drain electrodes 13 in island structure. Partially etching the ohmic layer of amorphous Si, there are obtained completed thin-film transistors. Finally, a 2000 angstrom thick silicon nitride layer is formed as a protective layer to complete the TFT array substrate. Thereafter, an orientation process is effected for the overall glass substrate to fix a color filter substrate thereon and then the space therebetween is filled with liquid crystal and is sealed. The semi-finished product filled with liquid crystal is then sealed. The glass substrate is cut away therefrom and then a driver and a back light unit are connected thereto, thereby completing a liquid crystal display.

Figure 21:
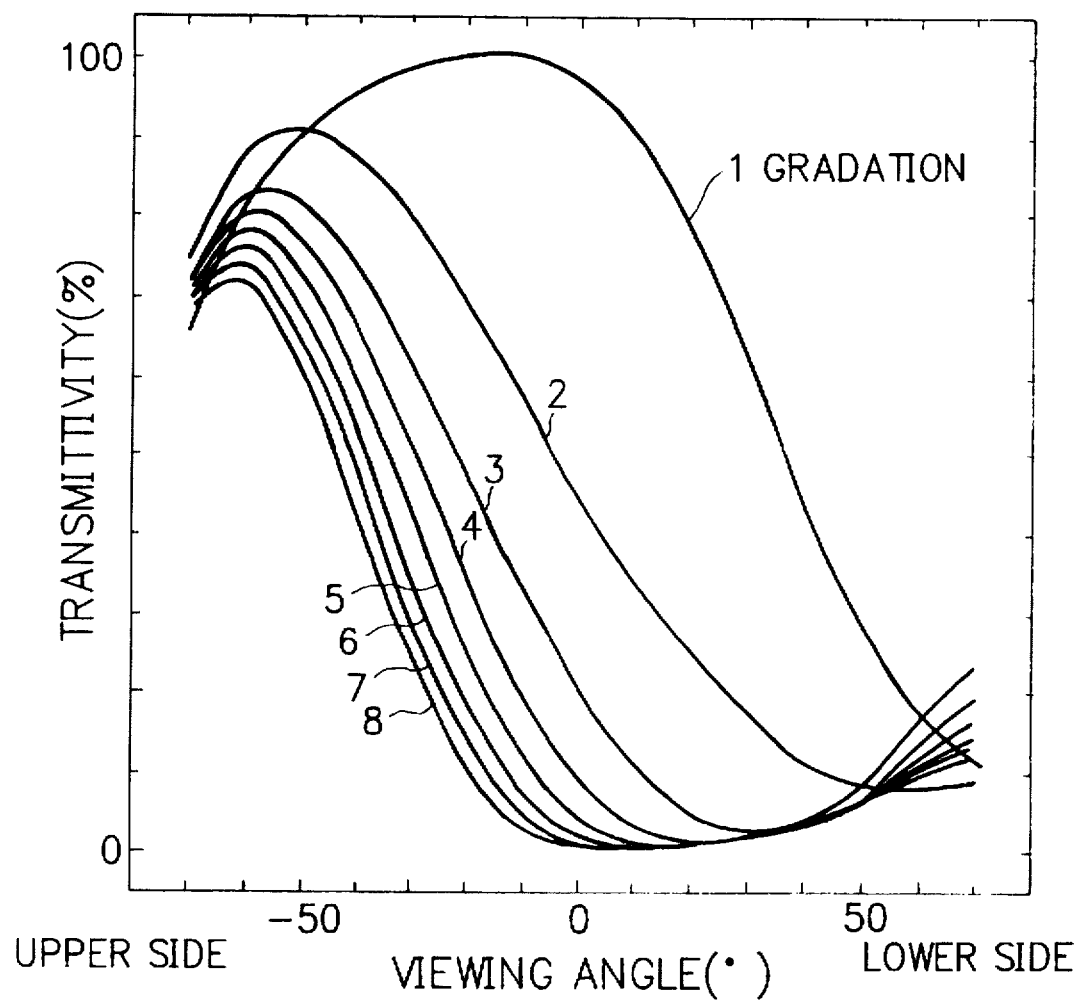
FIG. 21 is a graph showing a viewing angle characteristic in 8-gradation presentation of a liquid crystal display in accordance with the present invention.

FIG. 21 shows a viewing angle characteristic of the liquid crystal display thus produced. It can be understood from this graph that the viewing characteristic in the halftone display range is considerably improved when compared with that of FIG. 2.

Figure 22A:
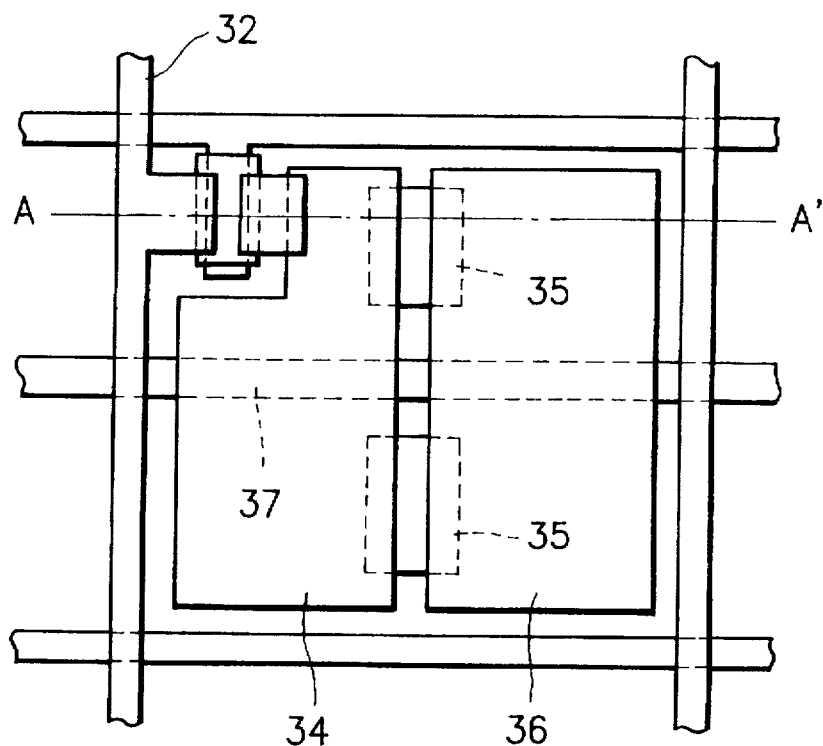
FIG. 22A is a plan view showing a thin-film transistor array of a liquid crystal display according to a second embodiment of the first invention.
Figure 22B:
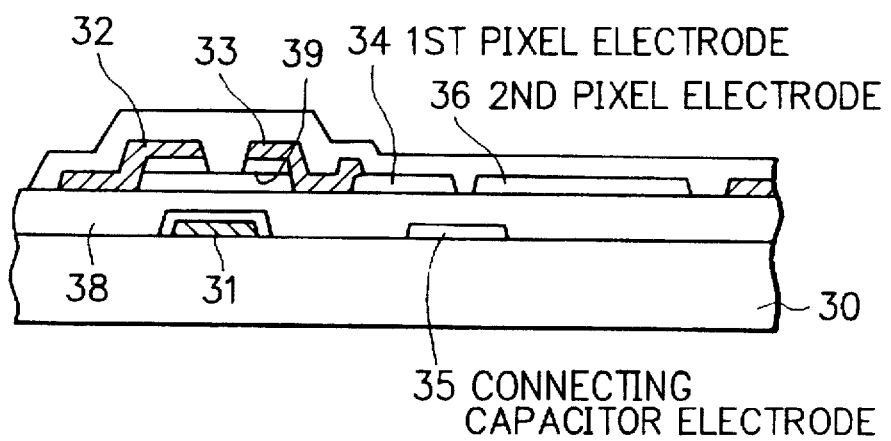
FIG. 22B is a cross-sectional view along line A–A' of FIG. 22A.

FIGS. 22A and 22B collectively show a second embodiment in accordance with the first invention in which FIG. 22A is a plan view of a TFT array of a liquid crystal display and FIG. 22B is a cross-sectional view along A-A' thereof. In this configuration, a lamination layer including Cr and transparent electrodes of indium tin oxide are used for scanning electrodes, and portions of the transparent electrodes used for the scanning electrodes are adopted for capacitor connecting electrodes 35. Also in this case, a process to form the scanning and gate electrodes and a process to fabricate the capacitor connecting electrodes are simultaneously accomplished. Consequently, the viewing angle characteristic can be improved without altering the fundamental process utilized for the conventional structure.

In FIGS. 22A and 22B, designated at reference character 30 is a glass substrate, 31 is a gate electrode or scanning electrode, 32 is a source electrode or signal electrode, 33 is a drain electrode, 34 is a first pixel electrode, 36 is a second pixel electrode, 37 is a storage capacitor electrode, 38 is a gate insulating layer, and 39 is a semiconductor film.

Figure 23A:
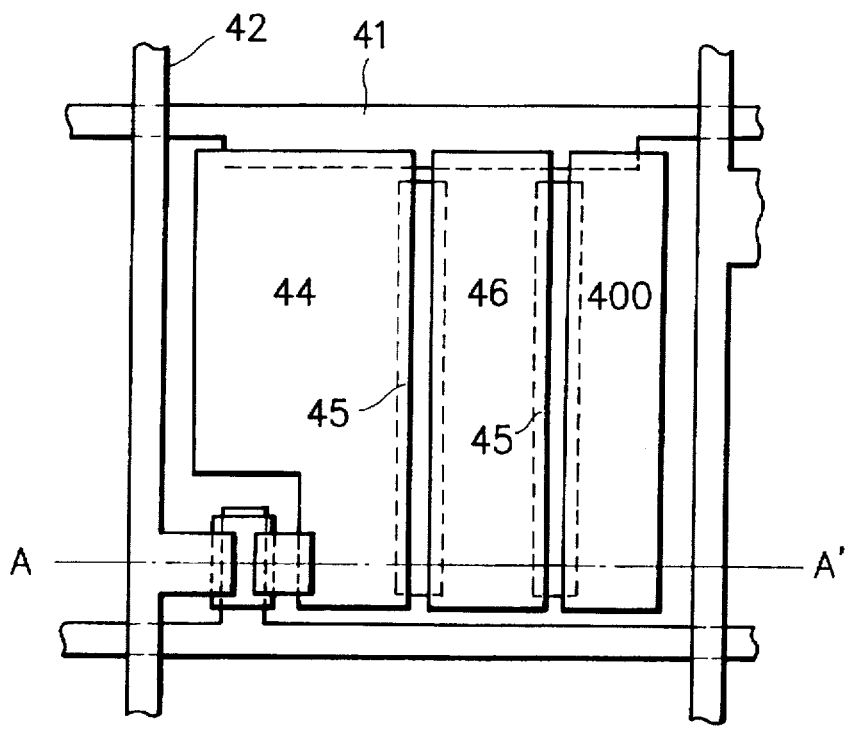
FIG. 23A is a plan view showing a thin-film transistor array of a liquid crystal display according to a third embodiment of the first invention.
Figure 23B:
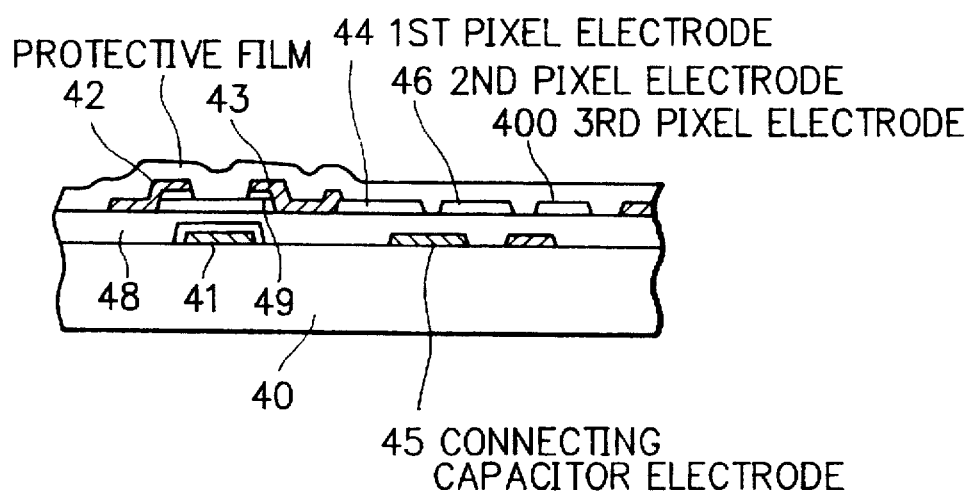
FIG. 23B is a cross-sectional view along line A–A' of FIG. 23A.

FIGS. 23A and 23B are a plan view and a cross-sectional view along A–A' of a TFT array of a liquid crystal display in a third embodiment in accordance with the first invention. First, on a transparent glass plate 40, there is sputtered, for example, Ta to form a 2000 angstrom thick layer so as to fabricate scanning electrodes 41, gate electrodes integral with the scanning electrodes 41, and connecting capacitor electrodes 45 in island structure. Subsequently, a gate insulator film 48 having a thickness of 5000 angstrom and a 3000 angstrom thick amorphous Si film 49 are formed by a plasma CVD. Forming an amorphous Si film in island structure, indium tin oxide for a transparent electrode is sputtered to form a 500 angstrom thick layer to simultaneously fabricate first, second, and third pixel electrodes 44, 46 and 400 in island structure. The connecting capacitor electrodes and the first to third pixel electrodes are to be designed such that the first to third pixel electrodes are spatially superimposed onto or overlapped with the connecting capacitor electrodes.

In addition, designing the first to third pixel electrodes to be spatially superimposed onto the scanning electrodes of the preceding stage, there is obtained suitable operational stability of the liquid crystal. In the superimposing configuration onto the scanning electrodes, all pixel electrodes need not be superimposed thereonto. Moreover, areas of the first and second pixel electrodes vary between display modes of liquid crystal. Subsequently, a 1500 angstrom thick Cr film is formed by sputtering to fabricate signal electrodes 42, source electrodes integral with the scanning electrodes 42, and drain electrodes 43 in island structure. Partially etching the ohmic layer in the amorphous Si film, thin-film transistors are completed. Finally, a 2000 angstrom silicon oxide layer is formed as a protective film to finish the TFT array substrate. In this embodiment, there are formed amorphous thin-film transistors of the channel etch type. However, the present invention is effective also for other transistor structure, for example, for amorphous Si thin-film transistors of the channel protective film type as well as for transistors of other materials. Thereafter, an orientation process is effected to the semi-finished product, a color filter substrate is fixed thereonto, the space therebetween is filled with liquid crystal and is sealed. The glass substrate is cut away therefrom, and then a driver circuit and a back light unit are connected thereto, thereby obtaining a completed liquid crystal display.

Figure 24:
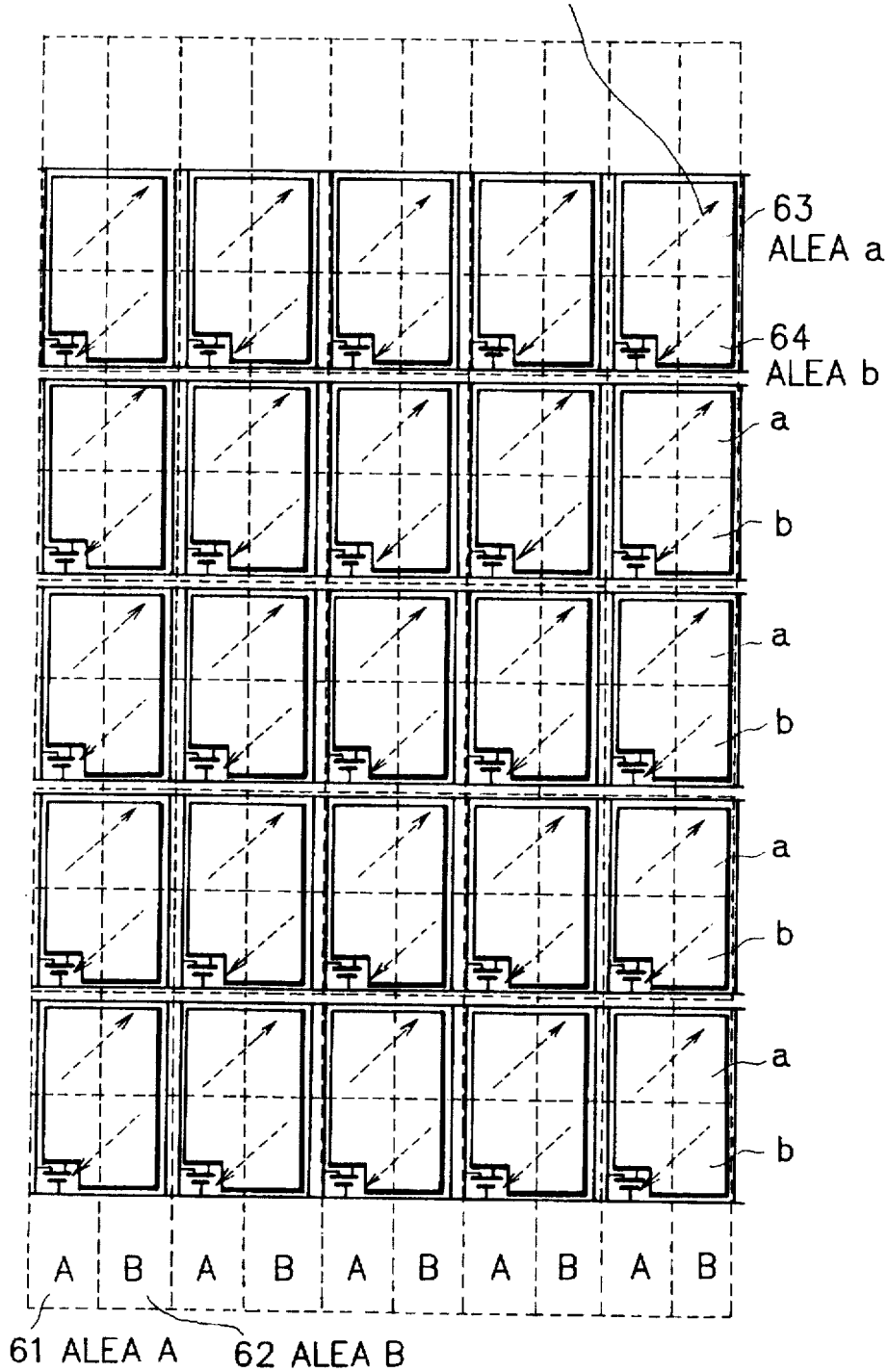
FIG. 24 is a plan view for explaining a fourth embodiment in accordance with the second invention.
Figure 25:
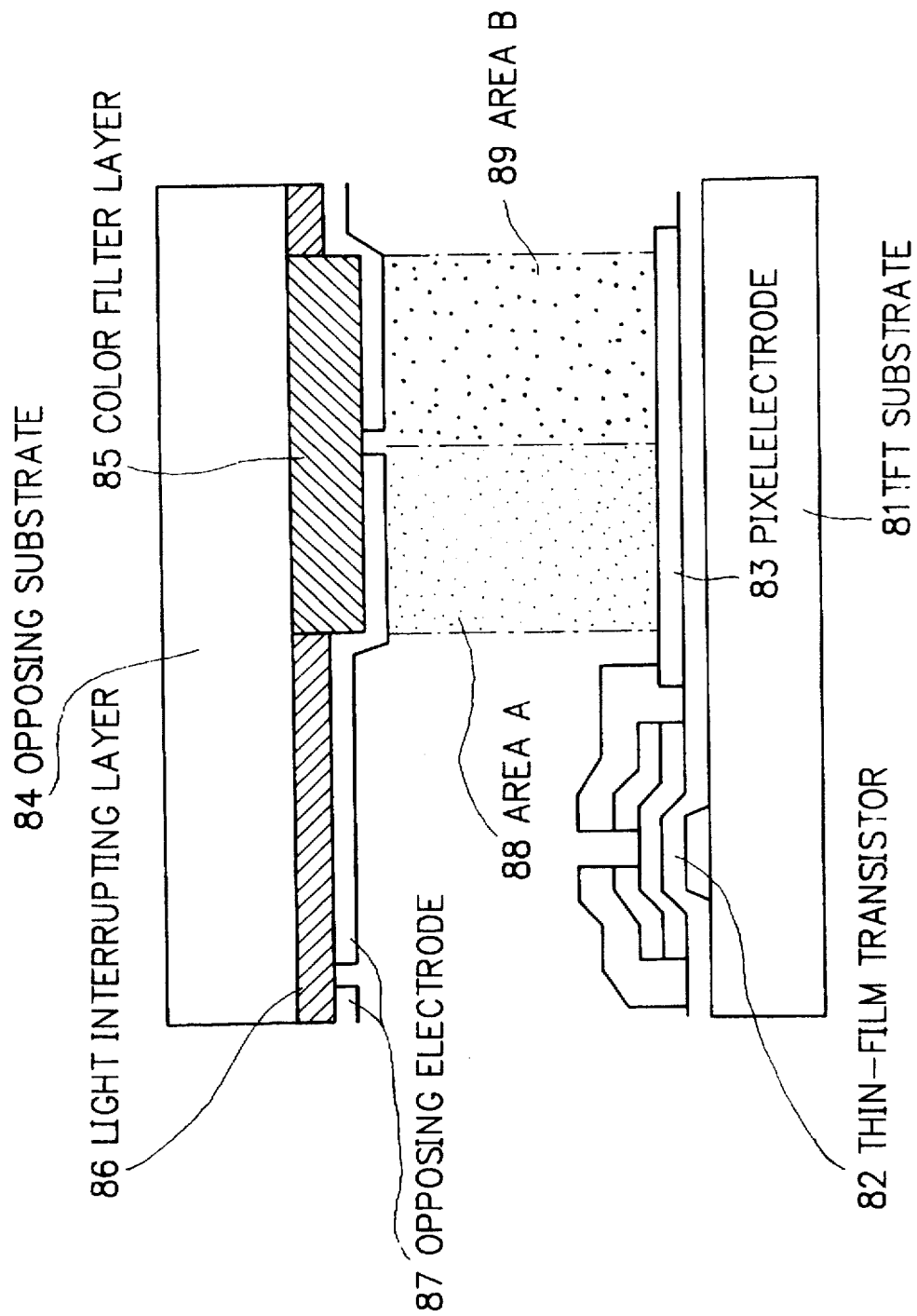
FIG. 25 is a cross-sectional view to explain the fourth embodiment according to the second invention.

Next, description will be given of a fourth embodiment according to a second invention. This embodiment includes a thin-film transistor (TFT) array substrate of amorphous silicon. In the TFT substrate, each pixel has a size of 100 μm×150 μm. FIG. 24 is a plan view of the TFT substrate in which each opposing electrode of the opposing substrate are subdivided into two groups such that the respective opposing electrode areas, i.e., area A's and area B's, are supplied with mutually different voltages. FIG. 25 is a cross-sectional view of a display including the TFT substrate as a member 81 and the opposing substrate as a member 84. In FIG. 25, designated by reference character 82 is a thin-film transistor, 83 is a pixel electrode, 85 is a color filter layer, 86 is a light interrupting layer, and 87 is an opposing electrode. The opposing electrodes 87 are shaped such that the surface area ratio between an area A 61 and an area B 62 is 4:6. When the opposing substrate is combined with the TFT substrate, the opposing electrodes are vertically subdivided as shown in FIG. 24.

Figure 26:
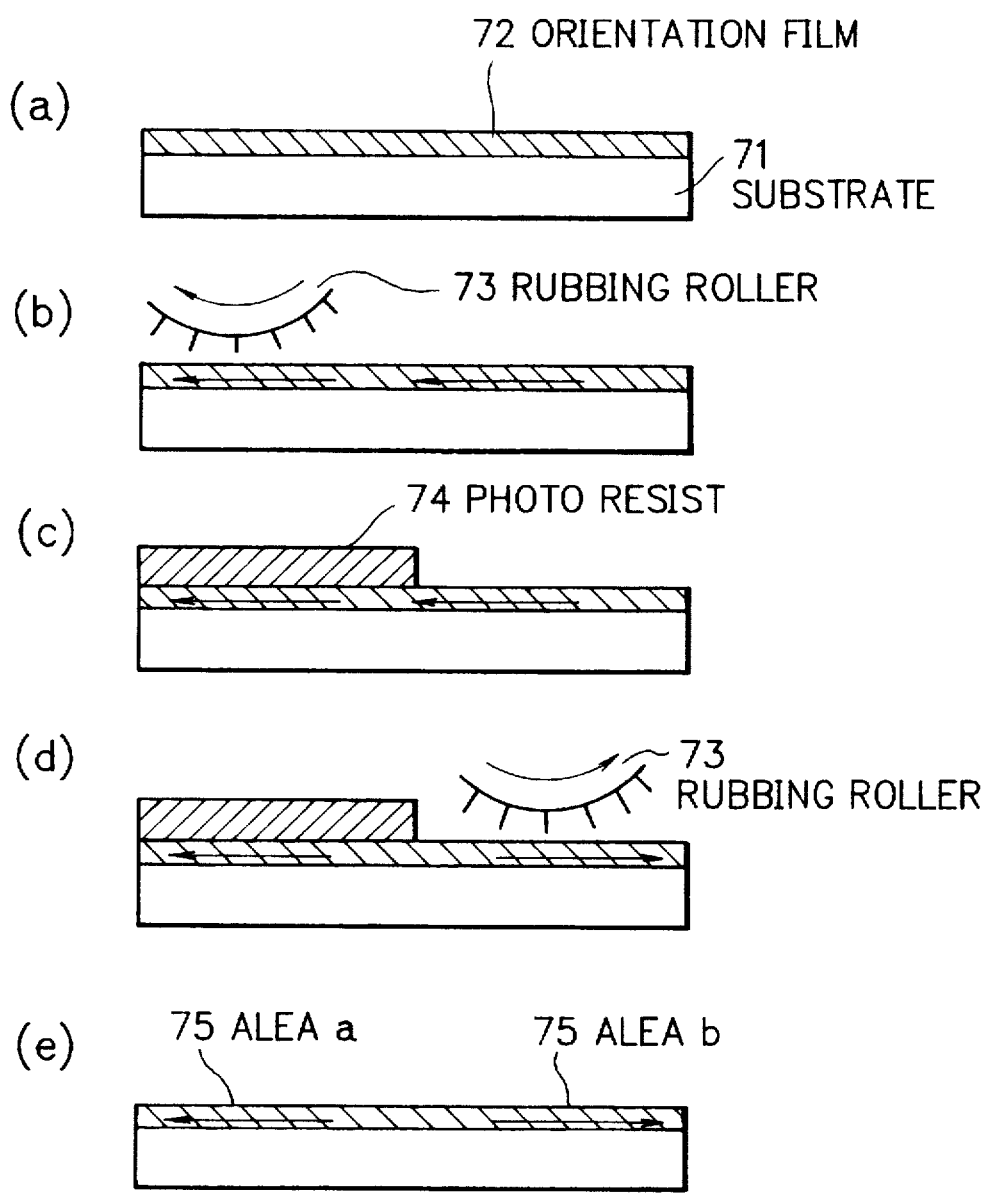
FIG. 26 is a process flow diagram for explaining the fourth embodiment of the second invention.

On the other hand, each pixel is vertically divided into two areas, i.e., an area "a" 63 and an area "b" 64, and is arranged such that the rubbing direction 65 is alternately varied in the pixels in the horizontal direction. The rubbing direction is determined through process steps of a process diagram shown in FIG. 26. As shown in FIG. 26(a), liquid polyimide is applied onto a TFT substrate 71 to be baked so as to form an orientation layer 72. Thereafter, as shown in FIG. 26(b), the overall substrate surface is subjected to an orientation process using a rubbing roller 73 according to the rubbing method. As shown in FIG. 26(c), the area a is subjected to a photo-resist process to form a mask of photo-resist material 74. As can be seen from FIG. 26(d), a surface of the area b undergoes a rubbing process using the rubbing roller 73 in a direction opposite to that of FIG. 26(b) to achieve an orientation process on the area b. In this situation, the areas a and b have an equal area size. Thereafter, the photo-resist film 74 is peeled off to obtain a substrate as shown in FIG. 26(e) in which the areas "a" and "b" are respectively designated by reference characters 75. A similar area division is effected also from the opposing substrate including a color filter. These substrates are fixed onto each other with 6.2 μm thick spacers interposed therebetween. In this process, the substrates are so arranged that areas having a matching twist direction face each other. A space between the substrates is then filled with nematic liquid crystal to form TN structure. The liquid crystal is prepared by mixing ZLI-4792 of Merck Corp. with chiral dopant. Two polarizing plates are attached onto the liquid crystal cell such that polarized light passing axes of the respective plates are orthogonal to each other.

Figure 27:
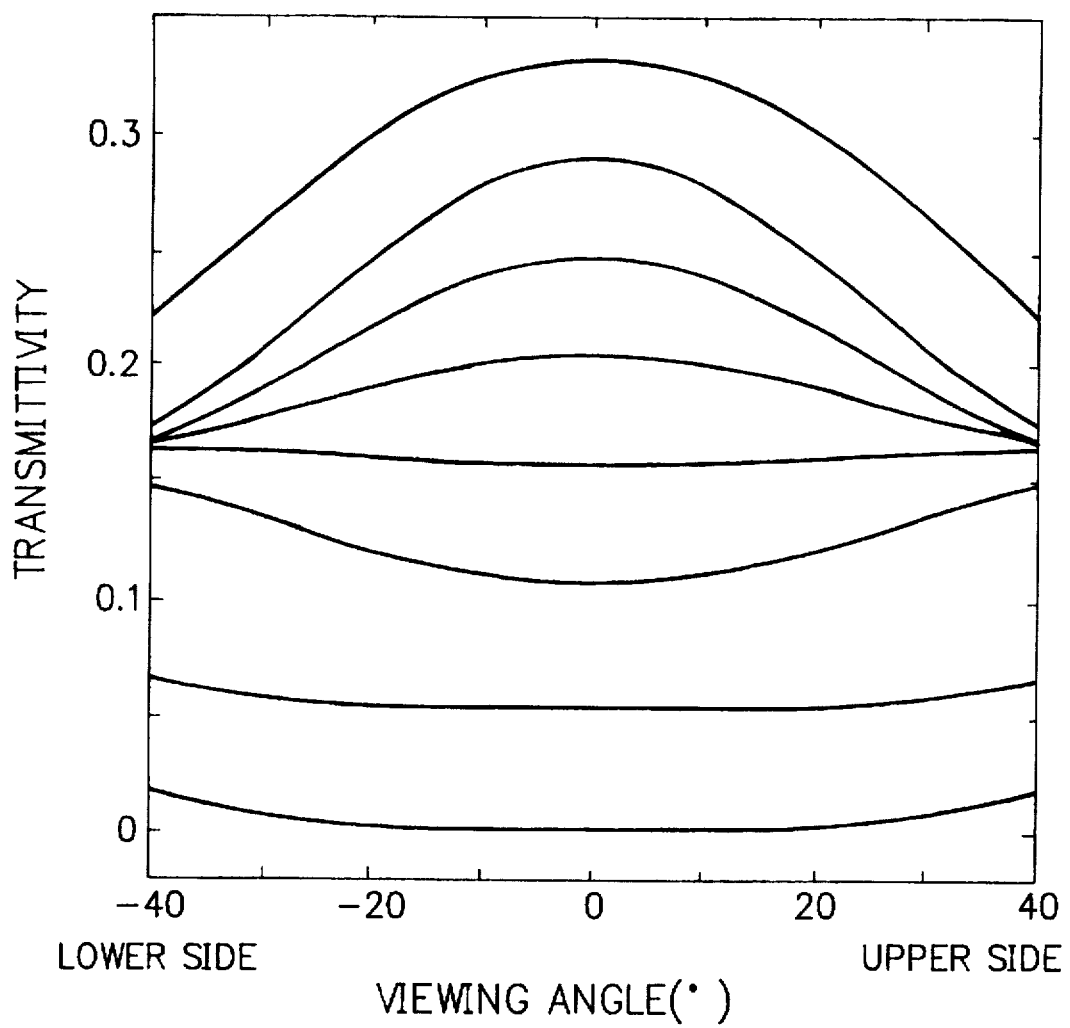
FIG. 27 is a graph showing a viewing-angle-vs-transmittivity characteristic of the fourth embodiment of the second invention.
Figure 28:
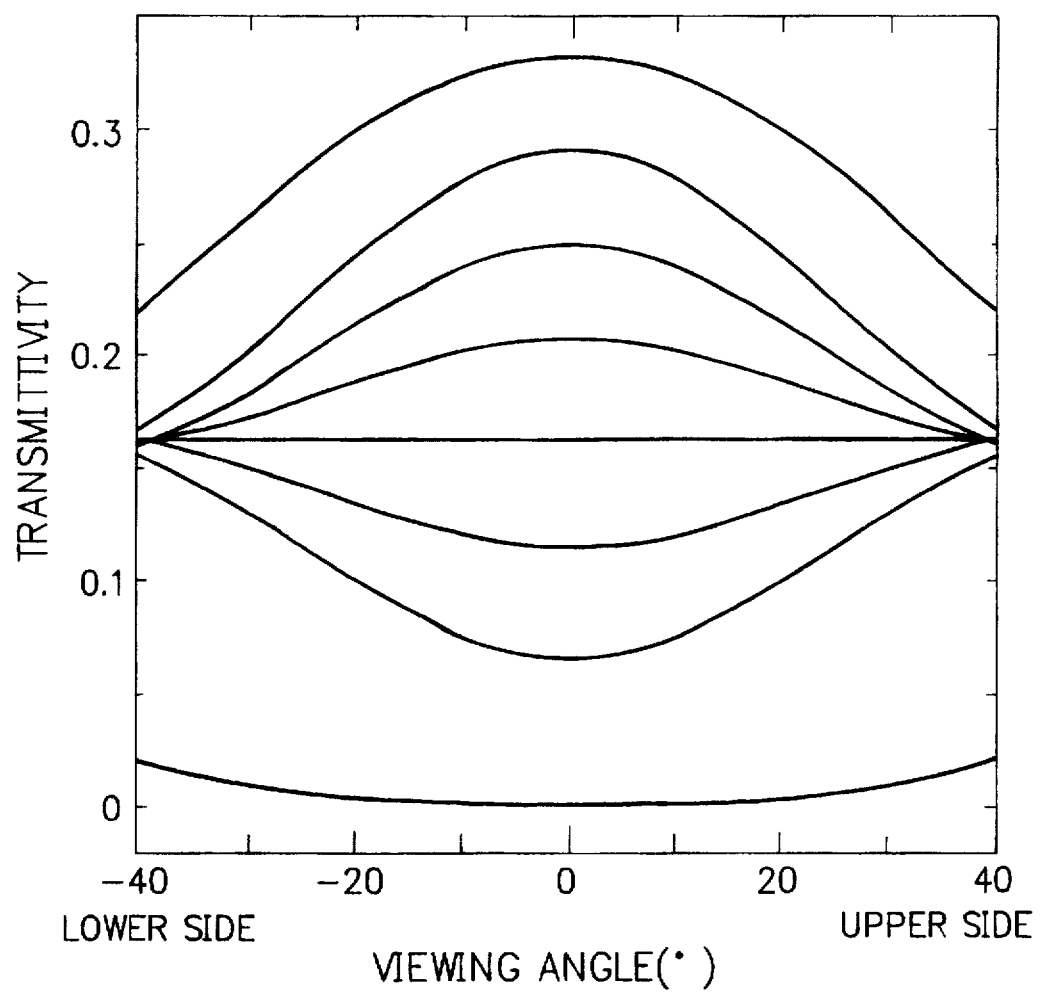
FIG. 28 is a graph showing a viewing-angle-vs-transmittivity characteristic of the fourth embodiment of the second invention.

Next, to measure viewing angle dependence of transmittivity for each gradation, the resultant thin-film transistors are actually driven. When driving the transistors, rectangular waves having a frequency equal to the frame cycle is applied to the opposing electrodes, the waves having an amplitude discrepancy of 1.4 volt. FIG. 27 is a graph showing measurement results of dependence of transmittivity on the viewing angle. For comparison, FIG. 28 shows comparable measurement results attained when the voltage difference between two opposing electrodes is substantially 0 volt. As can be seen from these graphs, when the difference between the voltages applied to liquid crystal in the areas A and B is 1.4 volt, the viewing angle dependence is remarkably improved for the second gradation level.

Figure 29:
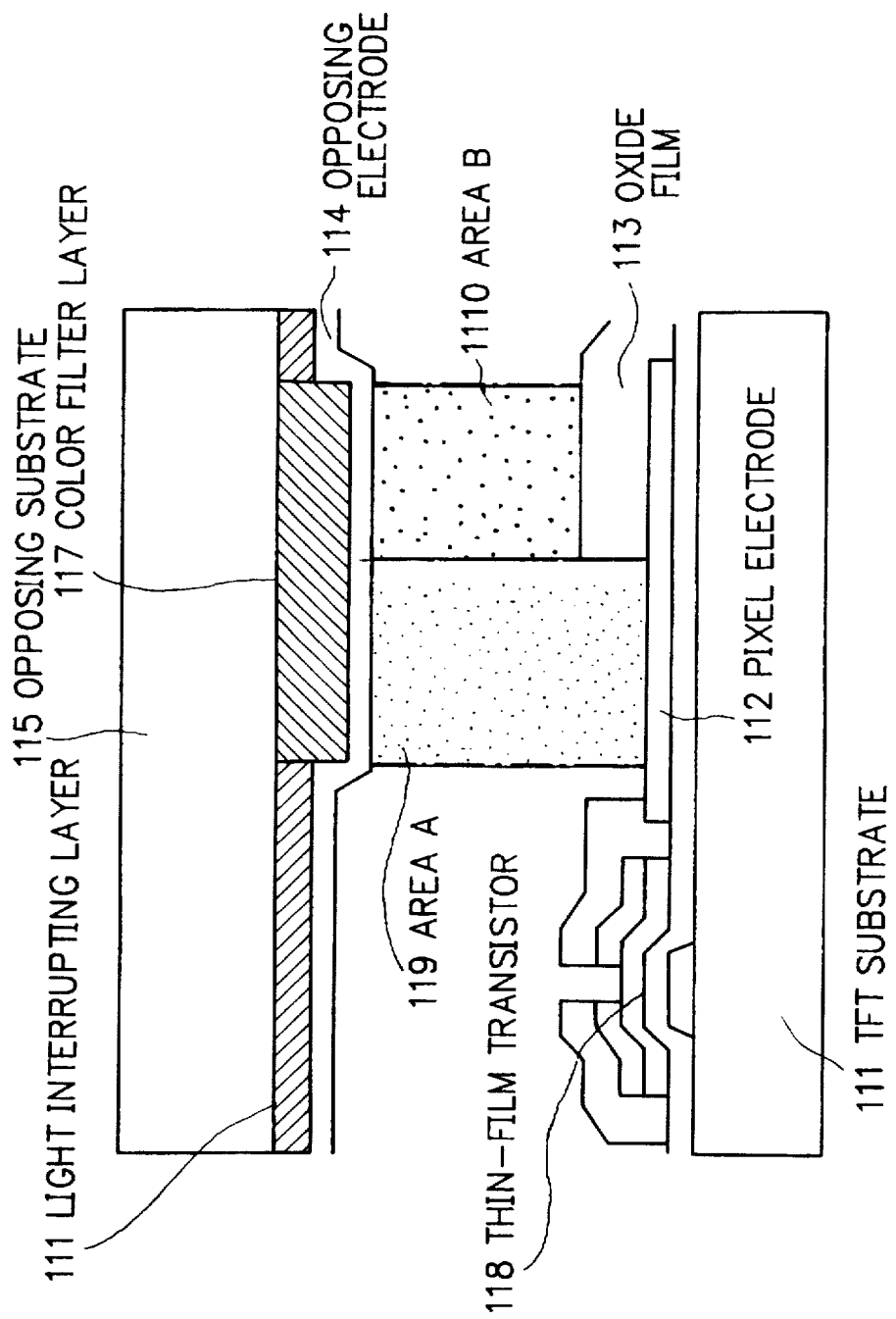
FIG. 29 is cross-sectional view useful to explain a fifth embodiment according to the second invention.
Figure 30:
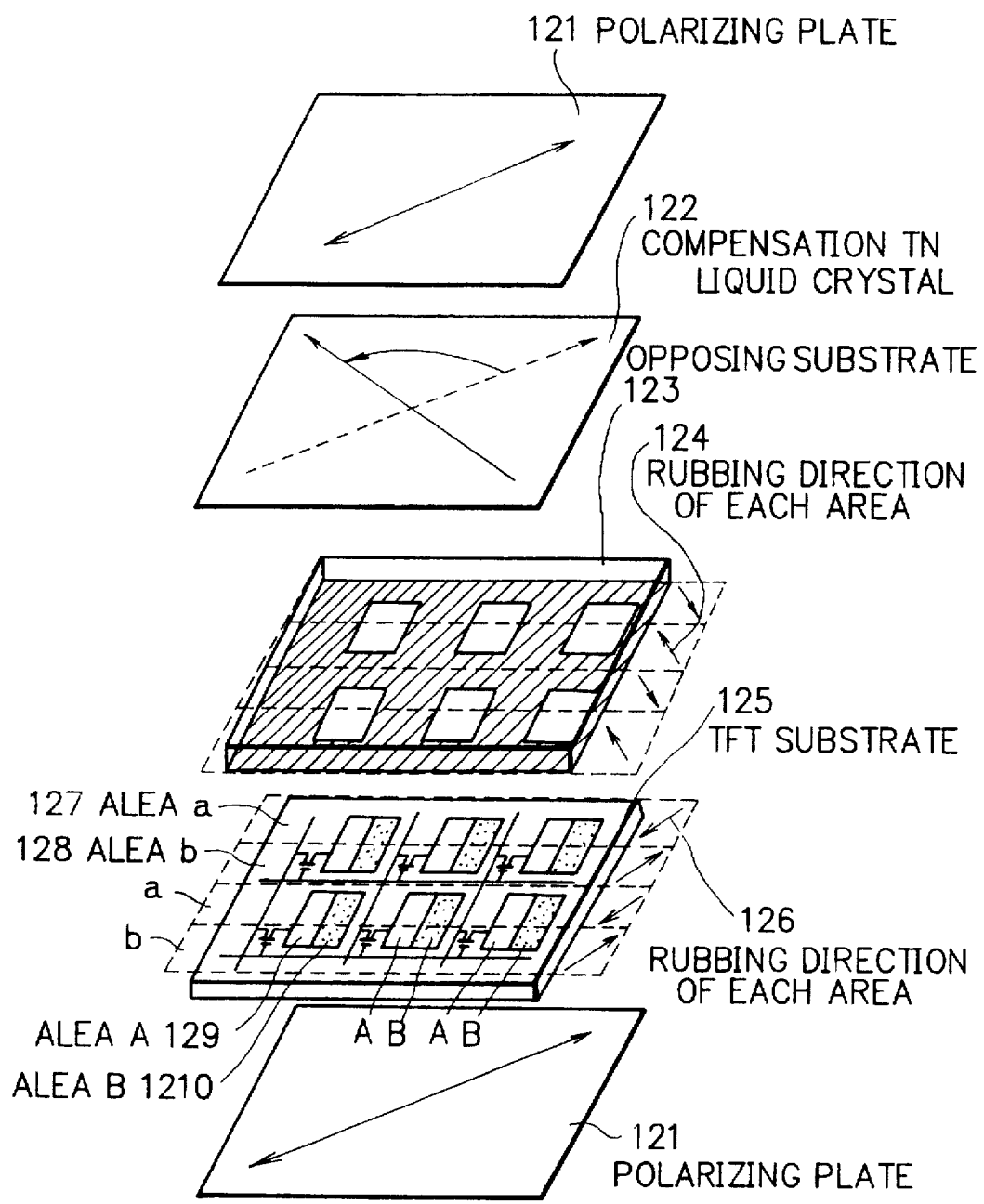
FIG. 30 is a perspective view for explaining the fifth embodiment according to the second invention.

Description will now be given of a fifth embodiment according to the second invention. In this embodiment, as shown in FIG. 29, an oxide film 113 is formed in a portion of a surface of a pixel electrode 112 on a TFT substrate 111 to form a capacitor. Using the capacitor, it is impossible to apply mutually different voltages to liquid crystal in areas A 119 and B 1110. These areas A and B have a surface area ratio of 4:6 therebetween. The voltage applied to liquid crystal of area A is set to 1.6 times that applied to liquid crystal of area B, and the oxide film 113 has a thickness of 2.2 μm. In FIG. 29, designated by reference character 114 is an opposing electrode, 115 is an opposing substrate, 116 is a light interrupting layer, 117 is a color filter layer, and 118 is a thin-film transistor. Referring now to FIG. 30 showing a perspective view of the process, subsequent manufacturing steps will be described. Employing the method described in conjunction with the preceding embodiment, there are prepared areas a 127 and b 128 having rubbing directions 126 different from each other by 180°. In FIG. 30, designated by reference character 121 is a pair of parallel polarizing plates, 122 is a compensation TN liquid crystal cell, 123 is an opposing substrate, 124 is a pair of opposite rubbing directions for areas a and b. 125 is an TFT substrate, 129 is an area A, and 1210 is an area B. The areas a and b have an identical area size. Liquid crystal used in this process is prepared by mixing dopant of left-handed chiral material with ZLI-4792 having refractive index anisotropy Δb=0.094 (Merck Corp.). Thereafter, a TN structure is produced in a manner similar to that used in the preceding embodiment. The cell gap is set to 5.1 μm such that transmittivity for a wavelength of 550 nanometers (nm) takes a minimum value in an interval between the parallel polarizing plates. However, this is not sufficient to obtain a complete black area on the display because leakage of light having other wavelengths. To overcome this difficult, mixing dopant of right-handed chiral material with ZLI-4972, there is prepared the compensation TN liquid crystal cell 122 having the same gap value so as to form a lamination of two liquid crystal cell layers.

Figure 31:
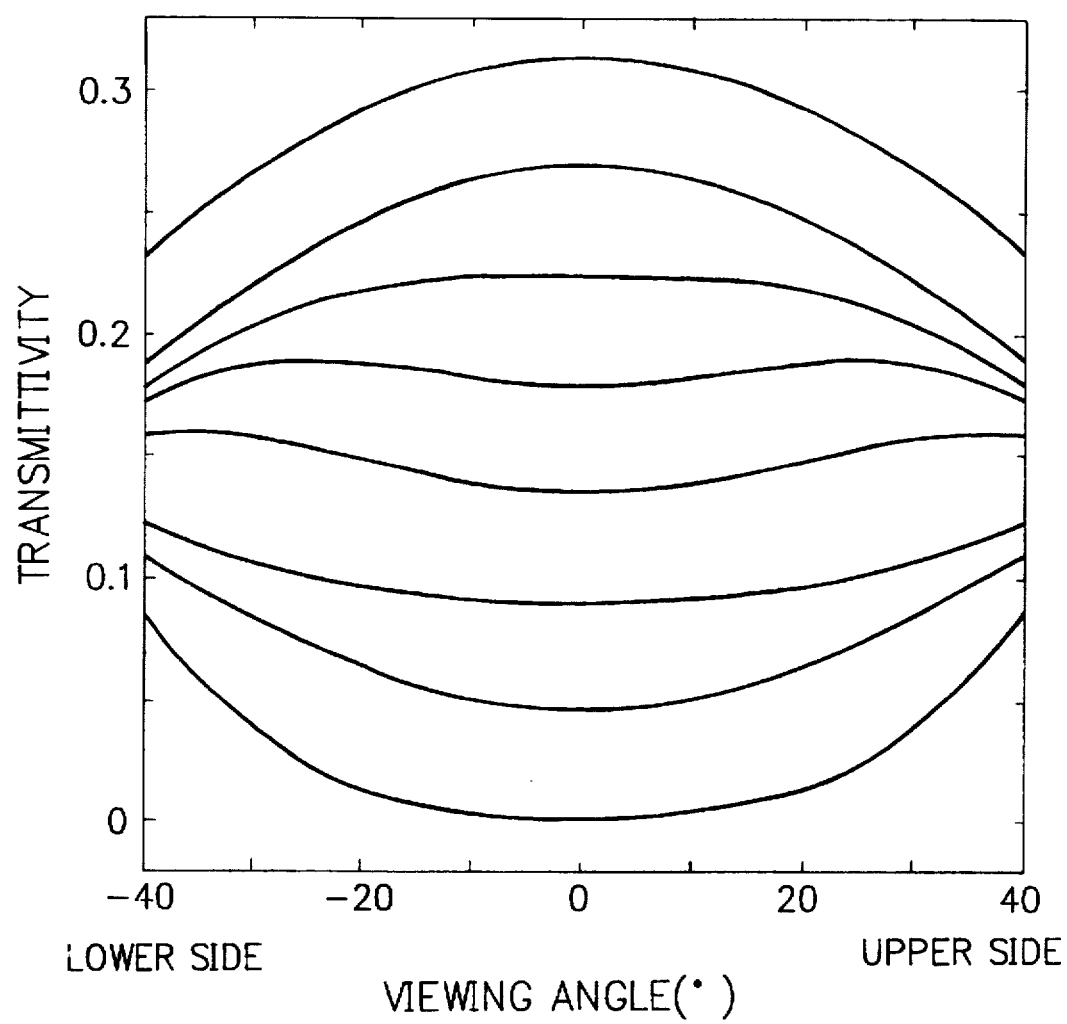
FIG. 31 is a graph showing a viewing-angle-vs-transmittivity characteristic of the fifth embodiment of the second invention.

Supplying drive voltages to the thin-film transistors of the TN liquid crystal cell, viewing angle dependence of transmittivity is measured for each gradation. FIG. 31 shows measured results. As can be seen from comparison between FIGS. 31 and 28, dependence of transmittivity on the viewing angle is considerably improved for the second and third gradation levels.

Description will now be given of a sixth embodiment according to the second invention. In this embodiment, using means similar to those adopted in the fifth embodiment, there is fabricated a structure in which mutually different voltages are applied to respective areas A and B containing liquid crystal. That is, on a pixel electrode of a thin-film transistor substrate of amorphous silicon, there is partially formed an oxide film to form a capacitor therebetween. On an opposing substrate including the thin-film transistor substrate and a color filter, there is applied a polyimid solution to be baked, thereby forming an orientation film. In this embodiment, the thin-film transistor substrate is attached onto the opposing substrate without conducting a rubbing process on the orientation film. Adjusting the size of spacers, the cell gap between these substrates is set to 6.3 μm. Mixing chiral dopant with nematic liquid crystal ZLI-4792, the pitch is set to four times the cell gap. The liquid crystal and the attached liquid crystal are heated such that the liquid crystal cell is filled with the liquid crystal in the isotropic phase. After the process is completed, the liquid cell is gradually cooled. Observing the liquid crystal cell by a polarizing microscope, it has been confirmed that each pixel contains a liquid crystal layer partitioned into many fine areas each having a diameter of about several micrometers. This is because liquid crystal in a fine area is twisted 90° and the direction of orientation of liquid crystal varies between the fine areas. The 90° twist of the nematic liquid crystal is due to chiral dopant contained therein.

Figure 32:
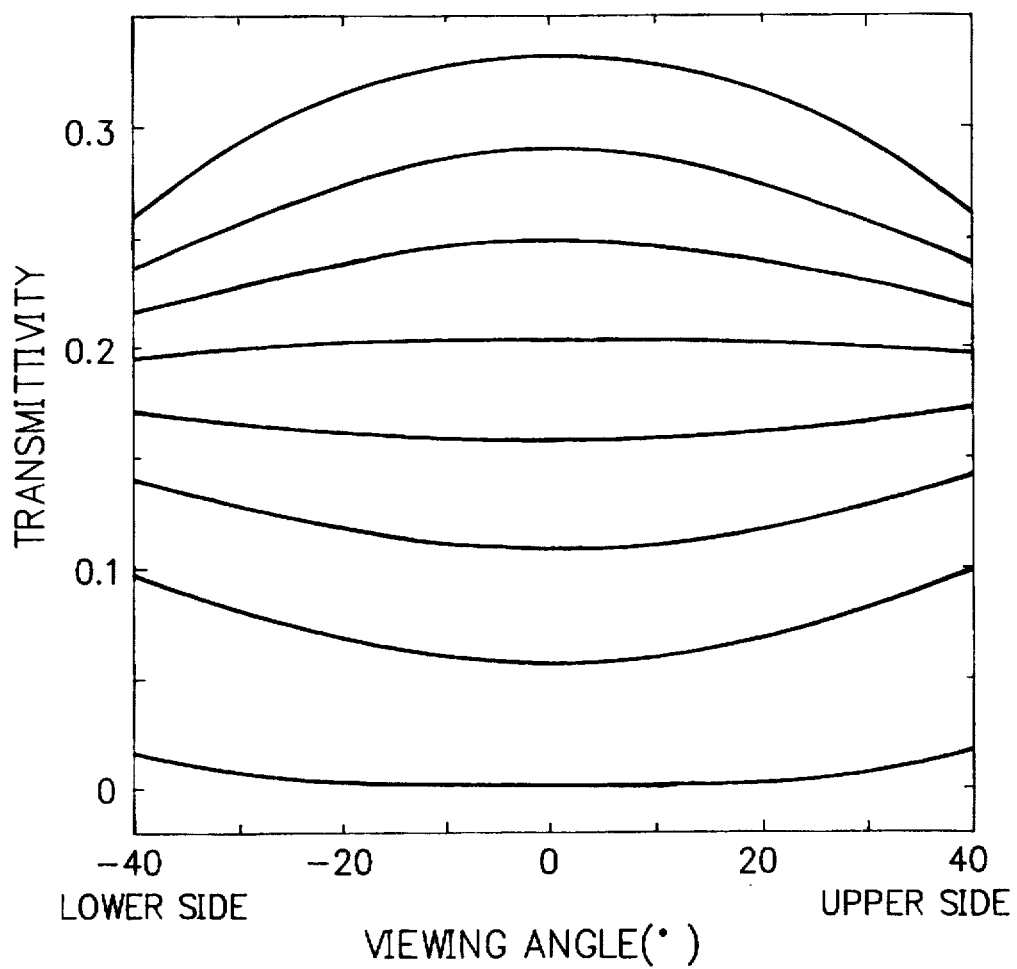
FIG. 32 is a graph showing a viewing-angle-vs-transmittivity characteristic of a sixth embodiment according to the second invention.

Subsequently, applying drive voltages to the thin-film transistors, viewing angle dependence of transmittivity is measured for each gradation. Results of measurement are shown in FIG. 32. Comparing FIG. 32 with FIG. 28, it can be understood that dependence of transmittivity on the viewing angle is remarkably improved for the second and third gradation levels.

Figure 33:
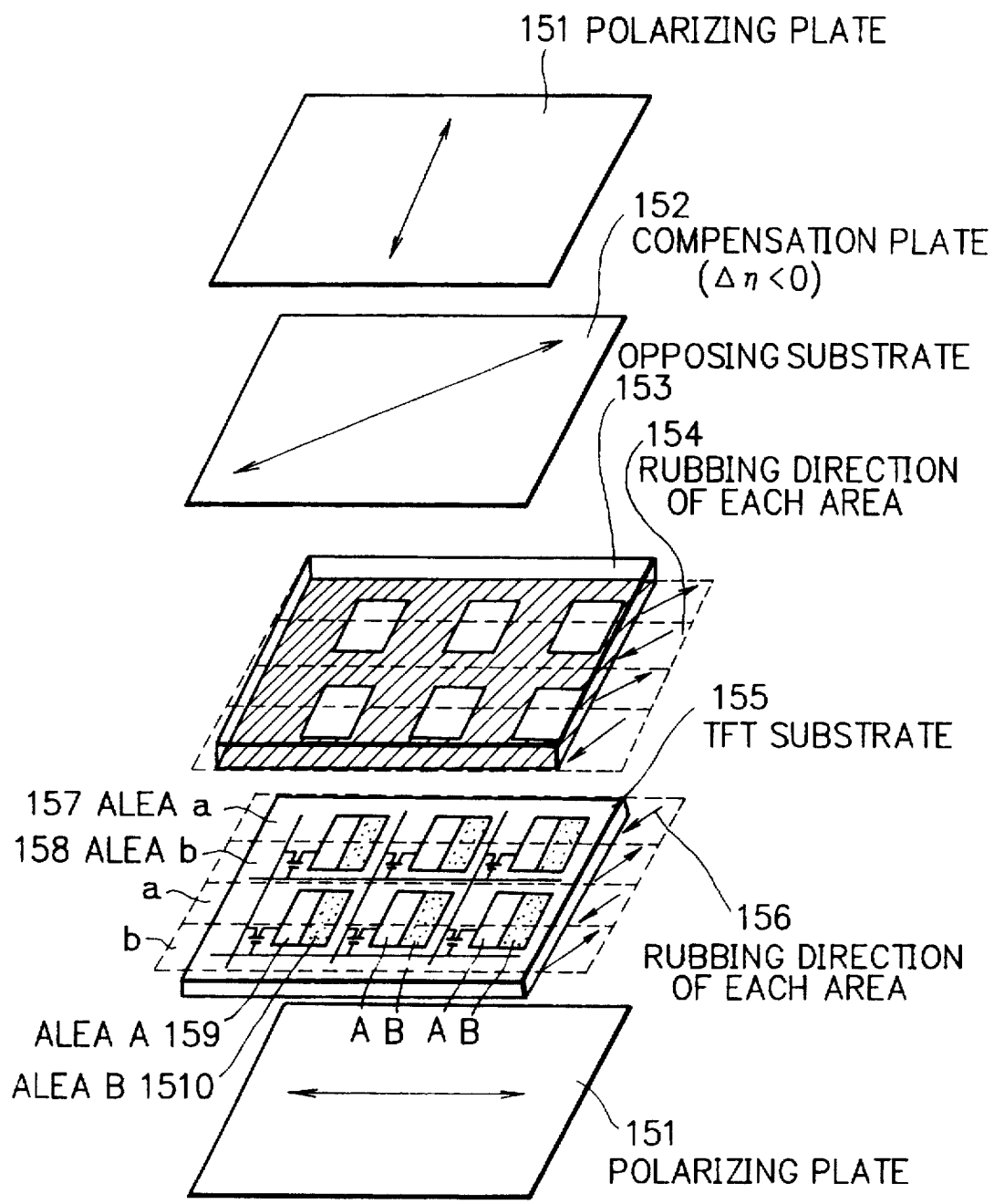
FIG. 33 is a perspective view for explaining a seventh embodiment according to the second invention.

Referring to FIG. 33, description will be given of a seventh embodiment in accordance with the second invention. In this embodiment, electric capacitors are formed in the oxide film in a method similar to that used for the fifth and sixth embodiments so as to resultantly apply mutually different voltages to the respective areas. A polyimid solution is applied onto a TFT substrate 155 and an opposing substrate 153 to be baked and to be subjected to a rubbing process. Thereafter, these substrates are attached onto each other such that their rubbing directions 154 and 156 for area a's 157 or area b's 158 are opposite to each other to obtain a homogenous orientation. Adjusting the diameter of spacers, the cell gap is set to 4.1 μm. The cell gap is filled with nematic liquid crystal not mixed with chiral dopant to attain a homogenous cell using nematic liquid crystal (ZLI-4792) having a refractive index anisotropy of 0.094. Extending and spreading a polystyrene film along an axis, there is prepared a compensation plate 152 such that the plate 152 is fixed onto the liquid crystal cell with the one-axis extending direction set to be parallel to the rubbing direction. Retardation of the plate 152 is Δnd=−0.385, which is the same as that of the homogeneous cell. These values however have opposite signs. Combining the homogeneous cell with the compensation plate, a black area can be presented in a large viewing angle range in absence of voltages. In FIG. 33, designated by reference character 151 is a pair of parallel polarizing plates.

Figure 34:
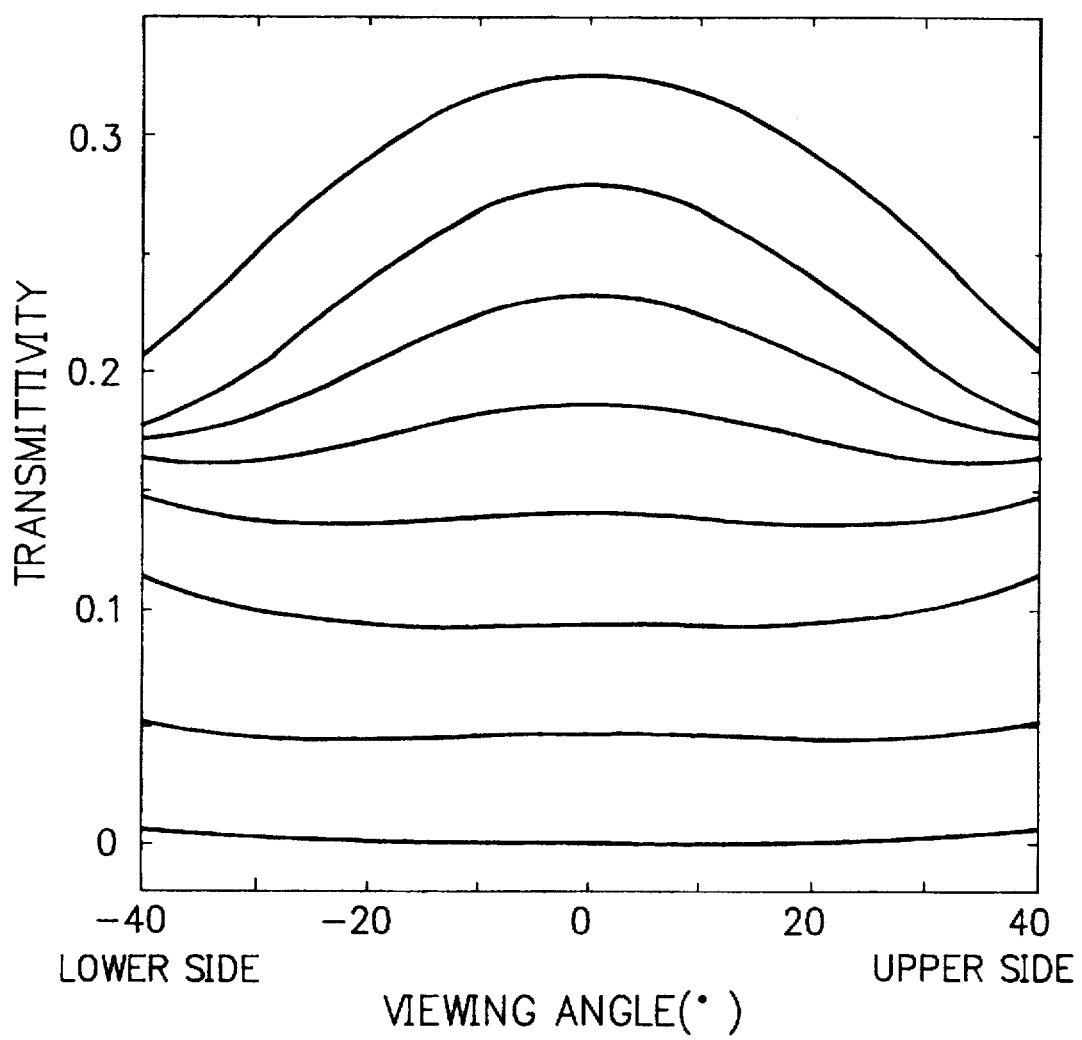
FIG. 34 is a graph showing a viewing-angle-vs-transmittivity characteristic of the seventh embodiment of the second inventions.

Applying drive voltages to the thin-film transistors, there is measured viewing angle dependence of transmittivity for each gradation. The voltage applied to liquid crystal of area A 159 is 1.5 times that applied to liquid crystal of area B 1510. The surface area ratio between areas A and B is 3:7. FIG. 34 shows measurement results. For comparison, FIG. 35 shows results of similar measurement in a case not using the voltage division through the electric capacitance of the oxide film. As can be seen from comparison between FIGS. 34 and 35, thanks to the present invention, dependence of transmittivity on the viewing angle is considerably decreased for the halftone presentation and visibility is thereby improved. As described above, the present invention is not limited to the TN liquid crystal mode but can be applied to other liquid crystal modes as well as to the conventional liquid crystal mode using an optical compensation plate.

Figure 36:
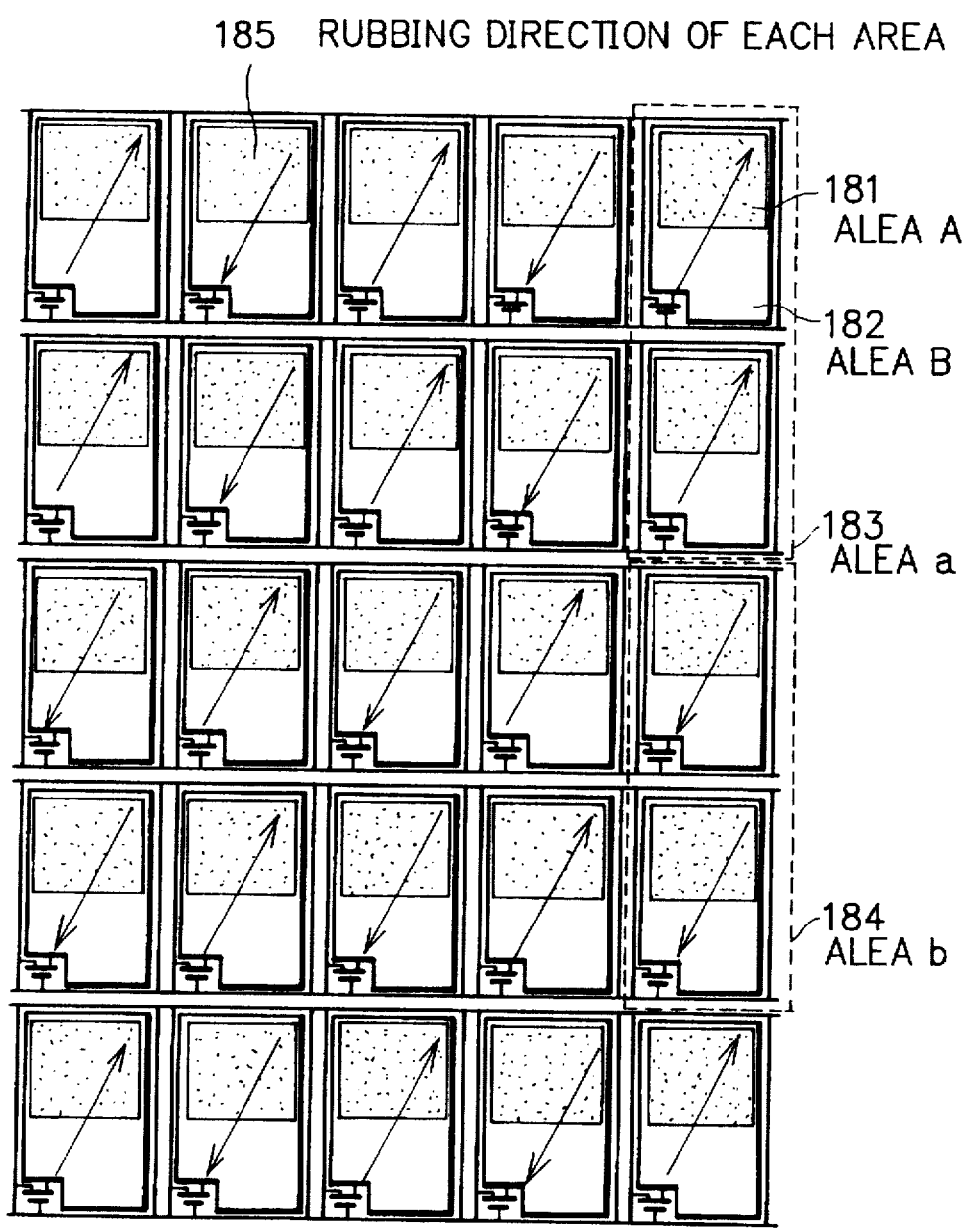
FIG. 36 is a plan view for explaining an eighth embodiment according to the second invention.

Description will now be given of an eighth embodiment according to the second invention. Like in the preceding embodiments, an oxide film is formed in a portion of an upper surface of a pixel electrode so as to divide each pixel into two areas A 181 and B 182. The surface ratio between areas A 181 and B 182 is 4:6. The voltage applied to liquid crystal of area A is 1.6 times that applied to liquid crystal of area B. The surface area ratio between areas A and B is 3:7. Using means similar to those of the preceding embodiments, there are formed areas a 183 and b 184 having opposite rubbing directions 185 for each pair of two vertical pixels as shown in FIG. 36. In the overall display screen, the total of areas a 183 is equal to that of areas b 184. Also the opposing substrate is subjected to the rubbing process with mutually different rubbing directions in association with those of areas a and b of the TFT substrate.

These two substrates are attached onto each other to configure the Tn structure.

Figure 37:
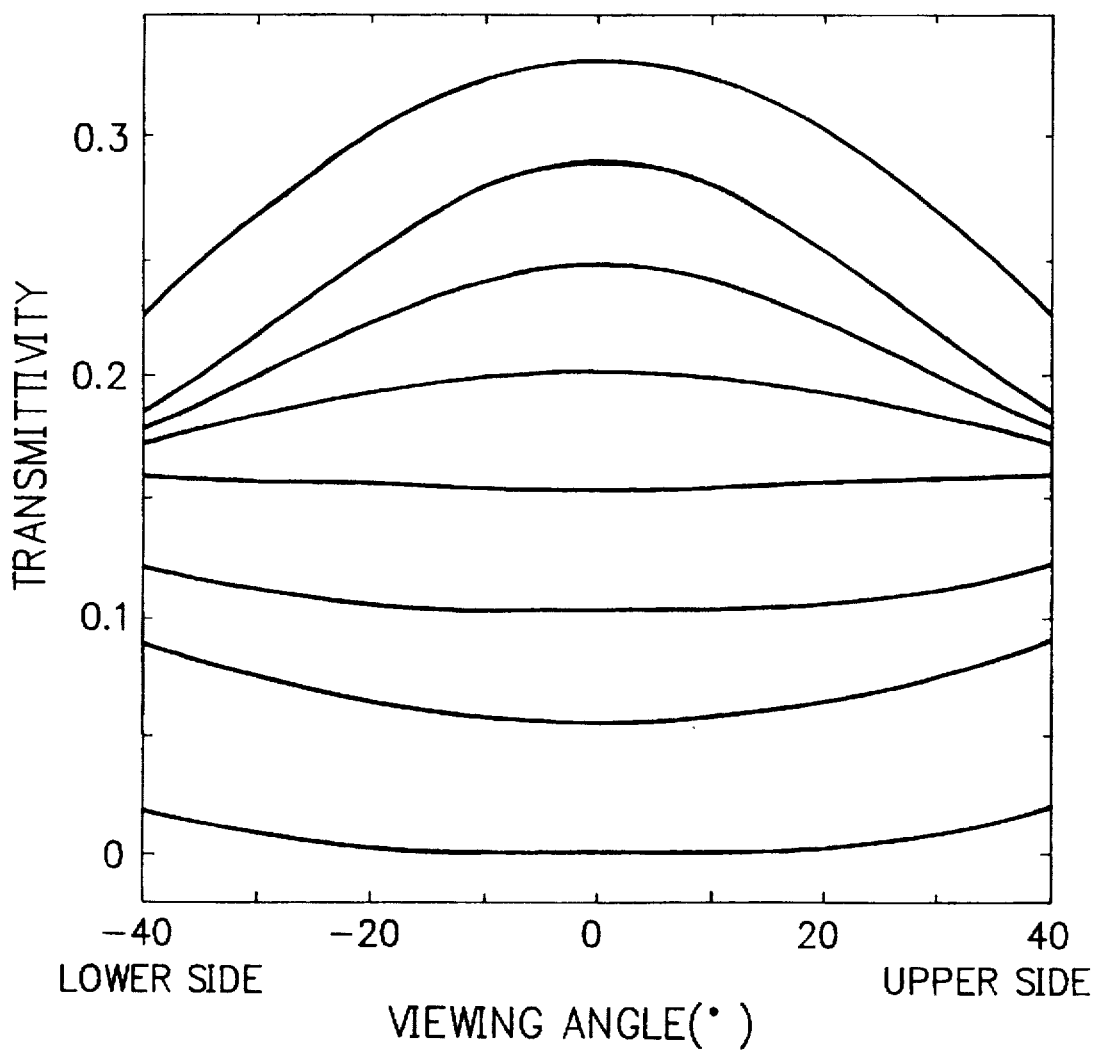
FIG. 37 is a graph showing a viewing-angle-vs-transmittivity characteristic of the eighth embodiment of the second embodiment.

Subsequently, applying drive voltages to the thin-film transistors, viewing angle dependence of transmittivity is measured for each gradation. The voltage applied to liquid crystal of area A is 1.6 times that applied to liquid crystal of area B. Results of measurement are shown in FIG. 37. From comparison between FIG. 37 and FIG. 28, it can be recognized that dependence of transmittivity on the viewing angle is remarkably improved for the second and third gradation levels.

Figure 38A:
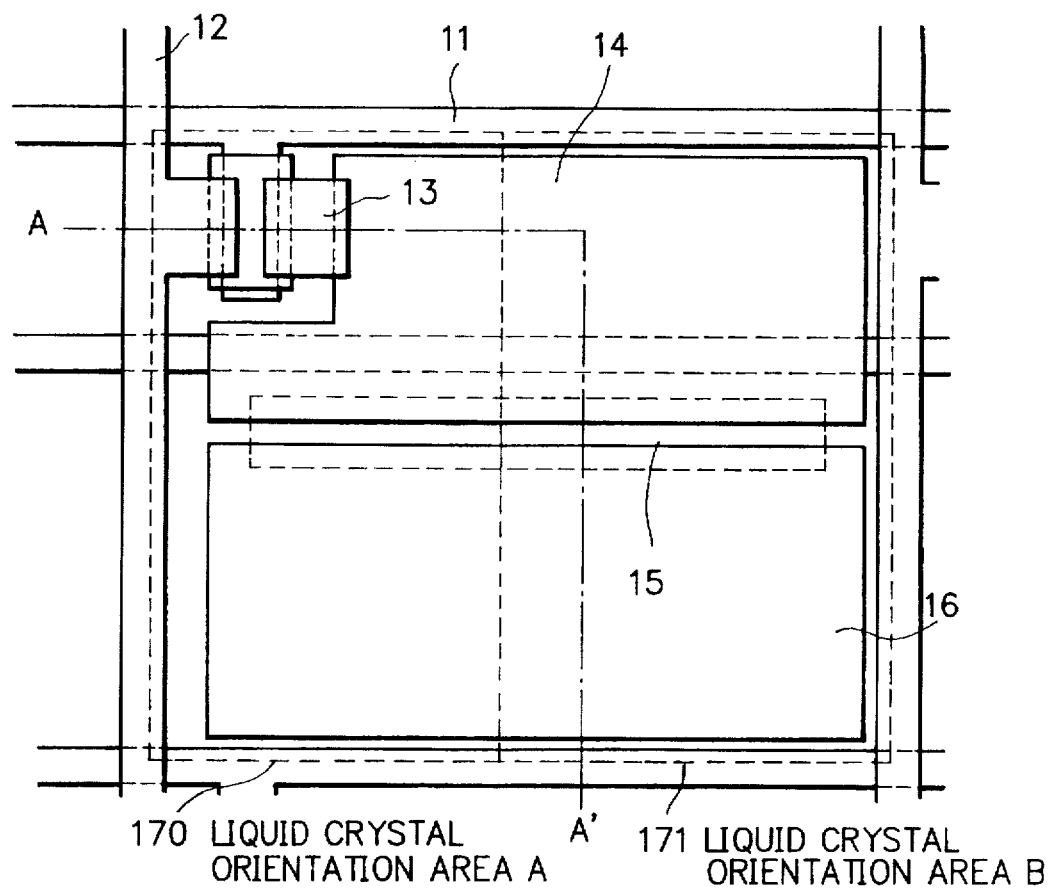
FIG. 38A is a plan view for explaining a first embodiment in accordance with the second invention.
Figure 38B:
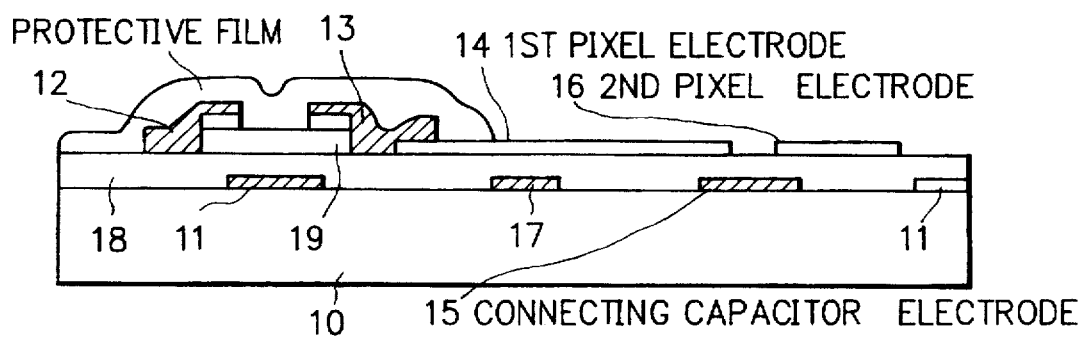
FIG. 38B is a cross-sectional view along line A-A' of FIG. 38A.

FIGS. 38A and 38B are a plan view and a cross-sectional view along A–A' of a first embodiment according to the second invention. This is implemented by forming areas a 170 and b 171 having mutually different orientation states of liquid crystal on the pixel electrodes of the first invention, e.g., electrodes 14 and 16 of FIGS. 20A and 20B. In these diagrams, the same constituent elements as those of FIGS. 20A and 20B are assigned with the same reference numerals and description thereof will be avoided. The TFT array substrate is produced in the same method as for the first embodiment according to the first invention.

Although this embodiment includes amorphous silicon thin-film transistors of a channel etch type, the present invention is effective for other transistors having another structure such as amorphous silicon thin-film transistors of a channel protective layer type as well as other transistors made of other materials.

Figure 39:
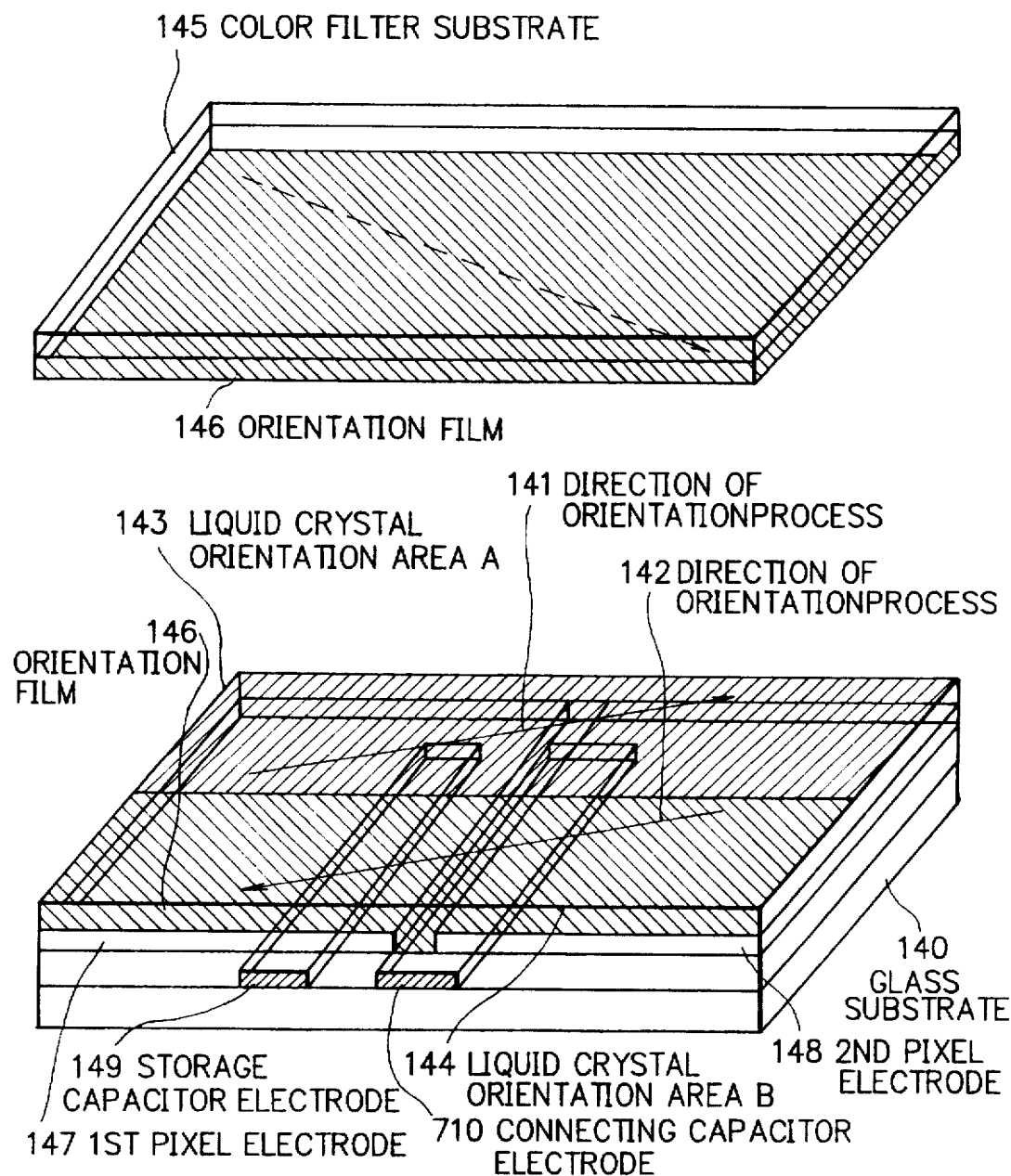
FIG. 39 is a perspective diagram showing the configuration of a liquid crystal display according to the first embodiment in accordance with the second invention.

To an orientation process is subjected an overall surface of a glass substrate 40 in a direction 141 of FIG. 39. Subsequently, a resist process is conducted on an area a 143. Thereafter, an area "b" 144 as an exposed portion of the glass substrate surface undergoes an orientation process in a direction 142. Removing the resist layer, the areas a 143 and b 144 are subjected to the orientation process in directions 141 and 142 respectively. In this process, an orientation film 146 is selected such that the pre-tilt angle of liquid crystal arranged between a substrate is 3°. For the color filter substrate 145, an orientation process is conducted in a direction vertical to the direction 142. Another orientation film 146 is selected such that the pre-tilt angle of liquid crystal is about 1°. In the orientation process of the color filter substrate, like in the case of the substrate including TFTs, the area thereof may be subdivided into two areas to be subjected to an orientation process such that these areas are oriented in directions respectively shifted by 90° from the directions 141 and 142.

In FIG. 39, designated by reference character 147 is a first pixel electrode, 148 is a second pixel electrode, 149 is a storage capacitor electrode, and 710 is a connecting capacitor electrode.

Moreover, the second invention is effectively applicable also to a case where the directions of orientation are increased, for example, to a case where the random orientation is used, namely, where the orientation process is not effected. Thereafter, the substrate including TFTs and the color filter substrate are fixed to each other, the gap therebetween is filled with liquid crystal and is then sealed.

The glass substrate is cut off. A driving circuit and a back light unit is connected to the obtained semi-finished product, thereby completing production of the liquid crystal display.

Figure 15:
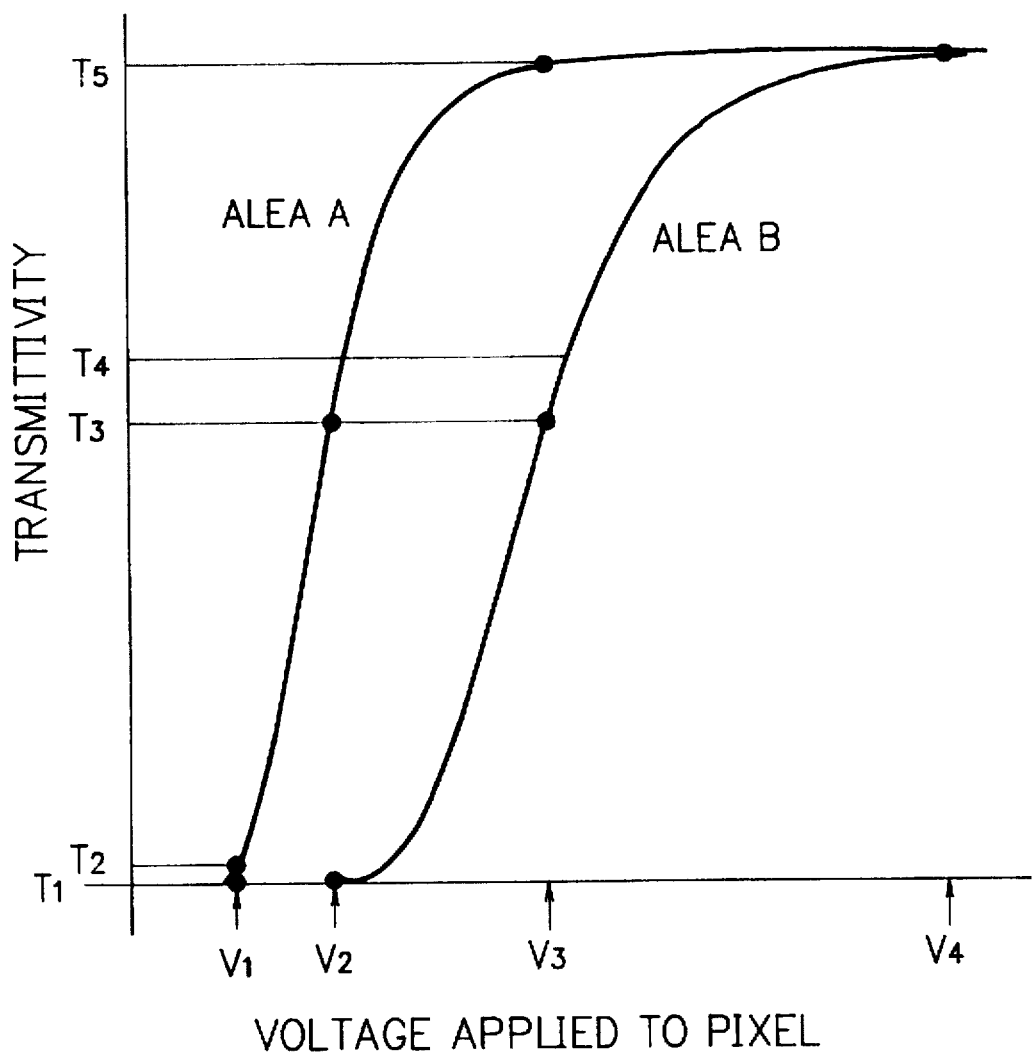
FIG. 15 is a graph showing a voltage-vs-transmittivity characteristic for explaining the second invention.
Figure 16:
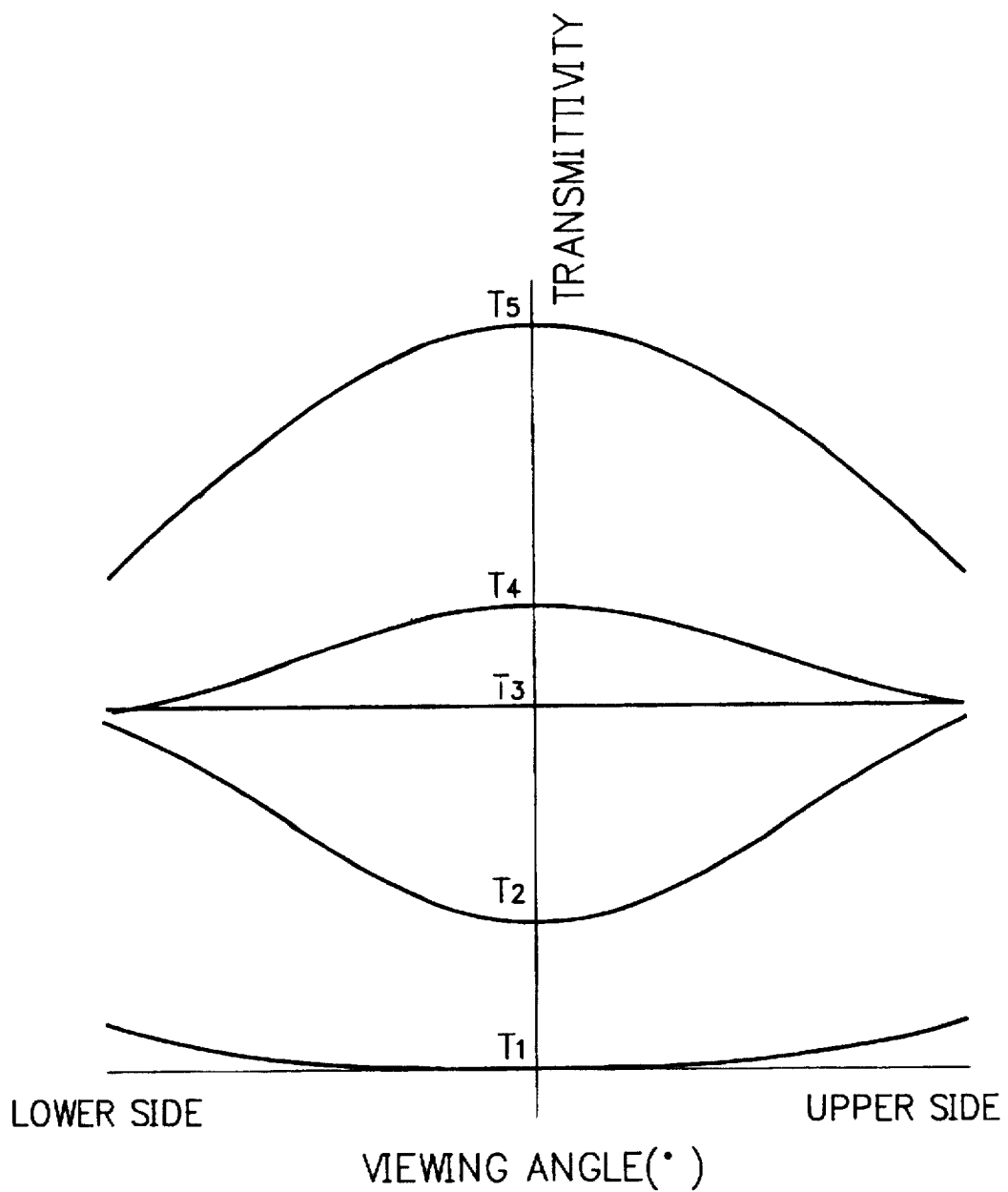
FIG. 16 is a graph showing a viewing-angle-vs-transmittivity characteristic useful to explain the second invention.
Figure 17:
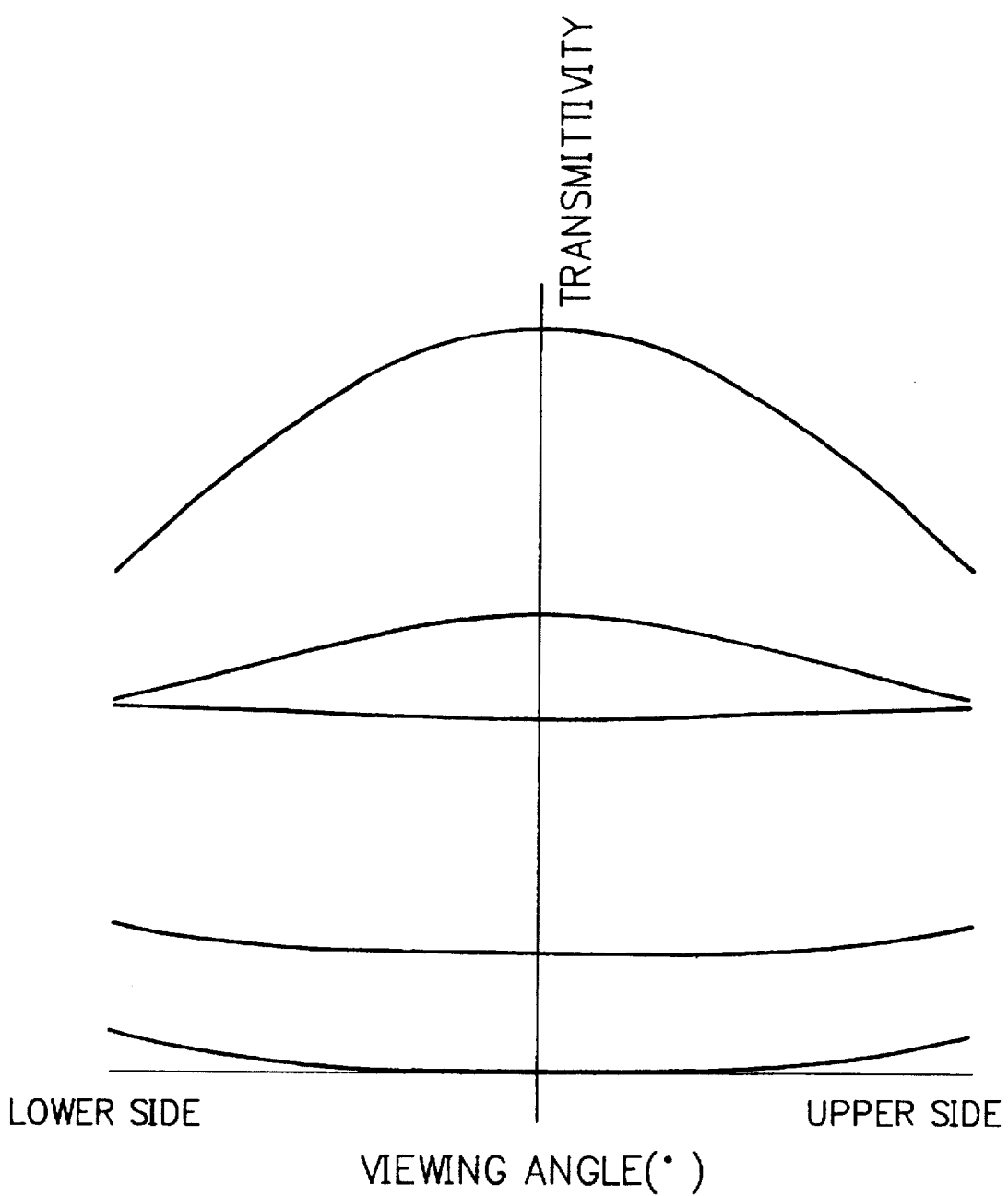
FIG. 17 is a graph showing a viewing-angle-vs-transmittivity characteristic for explaining the second invention.
Figure 18:
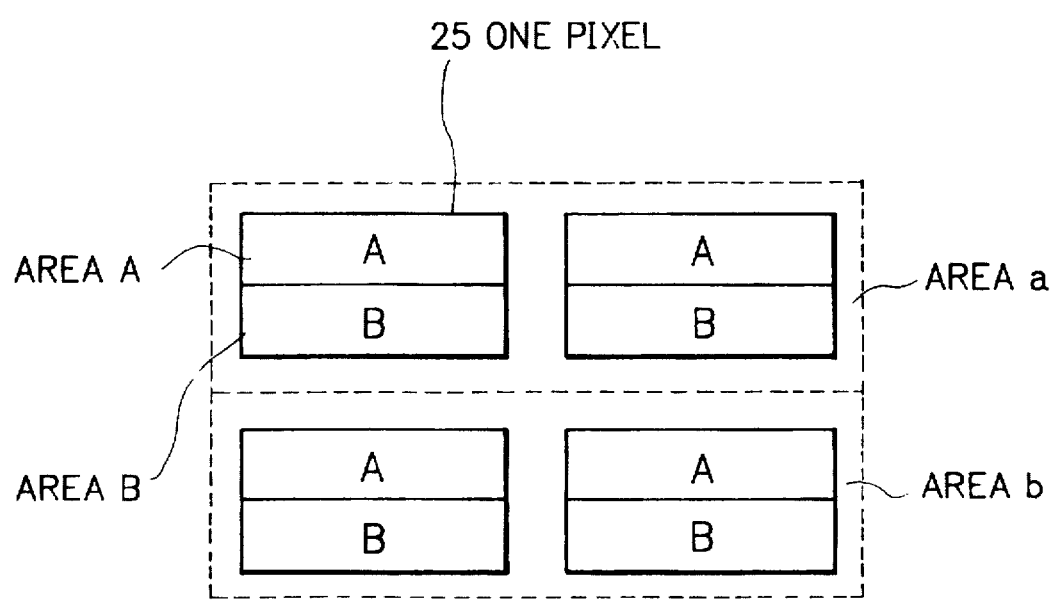
FIG. 18 is a plan view to explain a third embodiment of the second invention.
Figure 19:
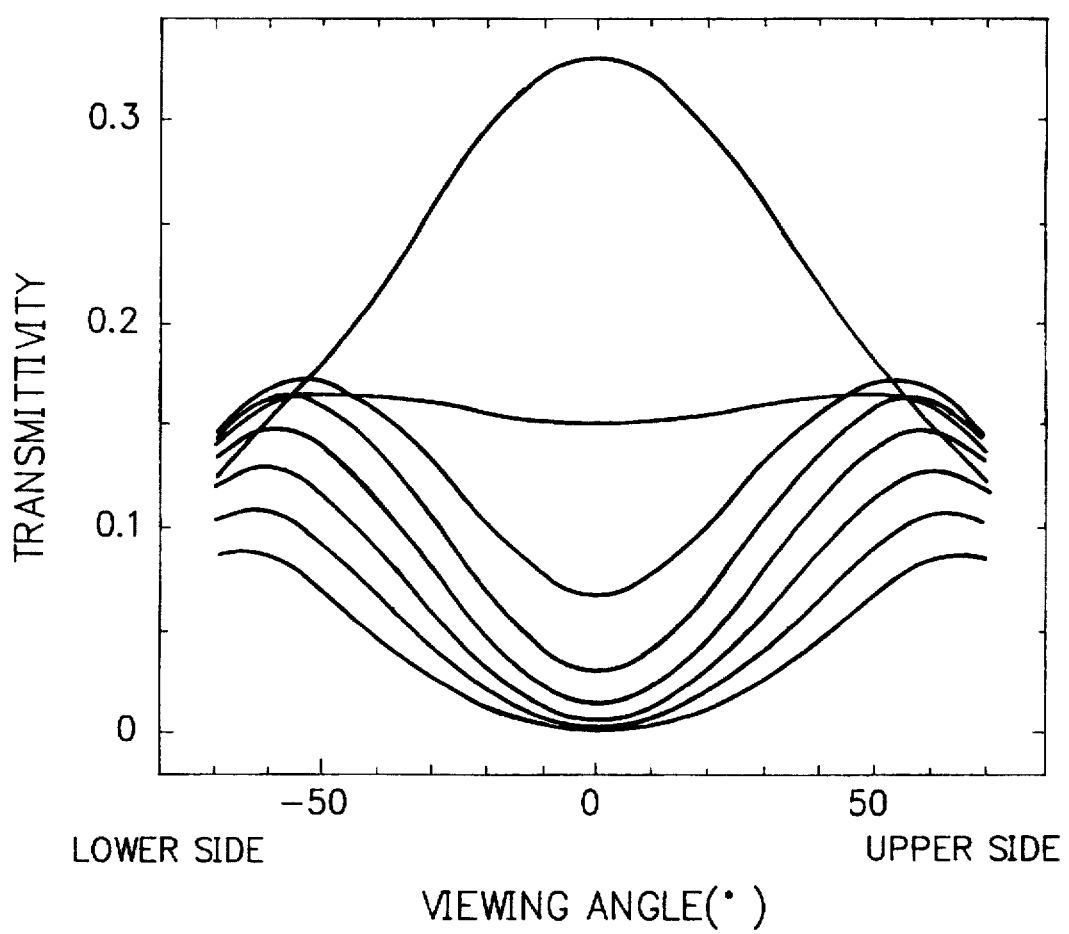
FIG. 19 is a graph showing a viewing angle characteristic in 8-gradation presentation in the vertical direction of a liquid crystal display employing pixel subdivision only according to directions of orientation.

FIG. 40 shows a viewing angle characteristic of the obtained liquid crystal display. Referring to the graph of FIG. 15 and comparing FIG. 40 with FIG. 19 of the conventional viewing angle characteristic, it is recognized that the view angle characteristic of the intermediate gradation display range is remarkably improved in the first embodiment of the second invention.

Figure 10:
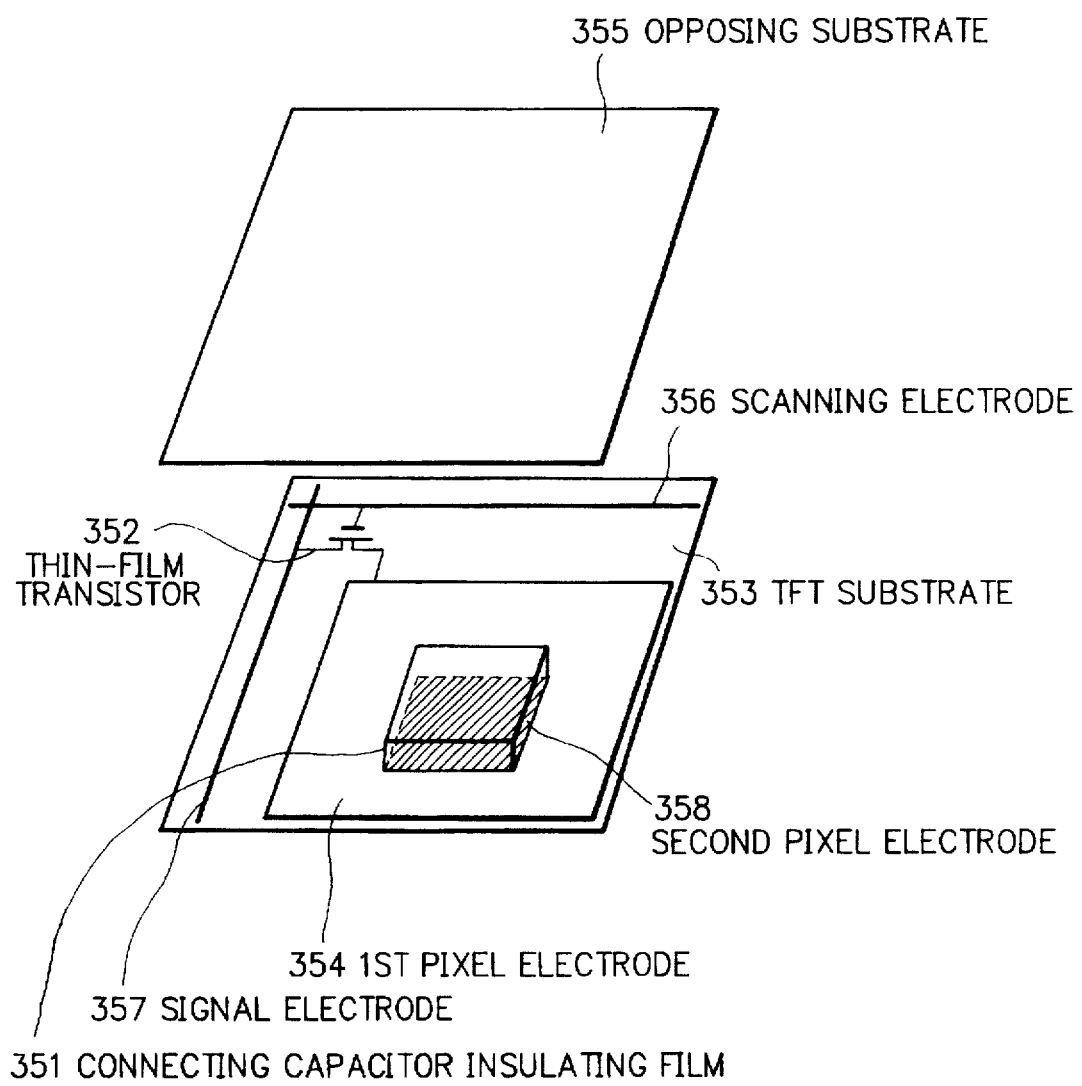
FIG. 10 is a perspective view to explain the prior art.
Figure 11:
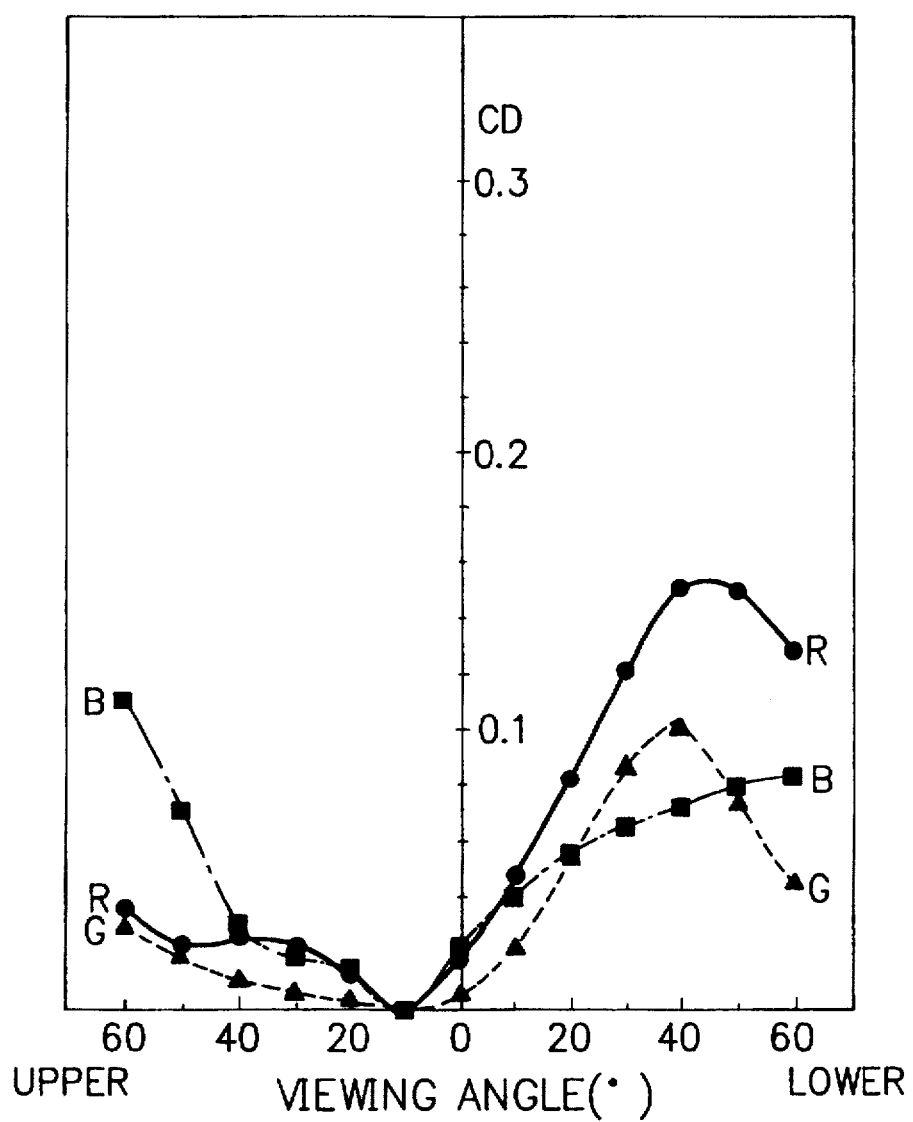
FIG. 11 is a graph showing a viewing-angle-vs-transmittivity characteristic for explaining the conventional technology.
Figure 12:
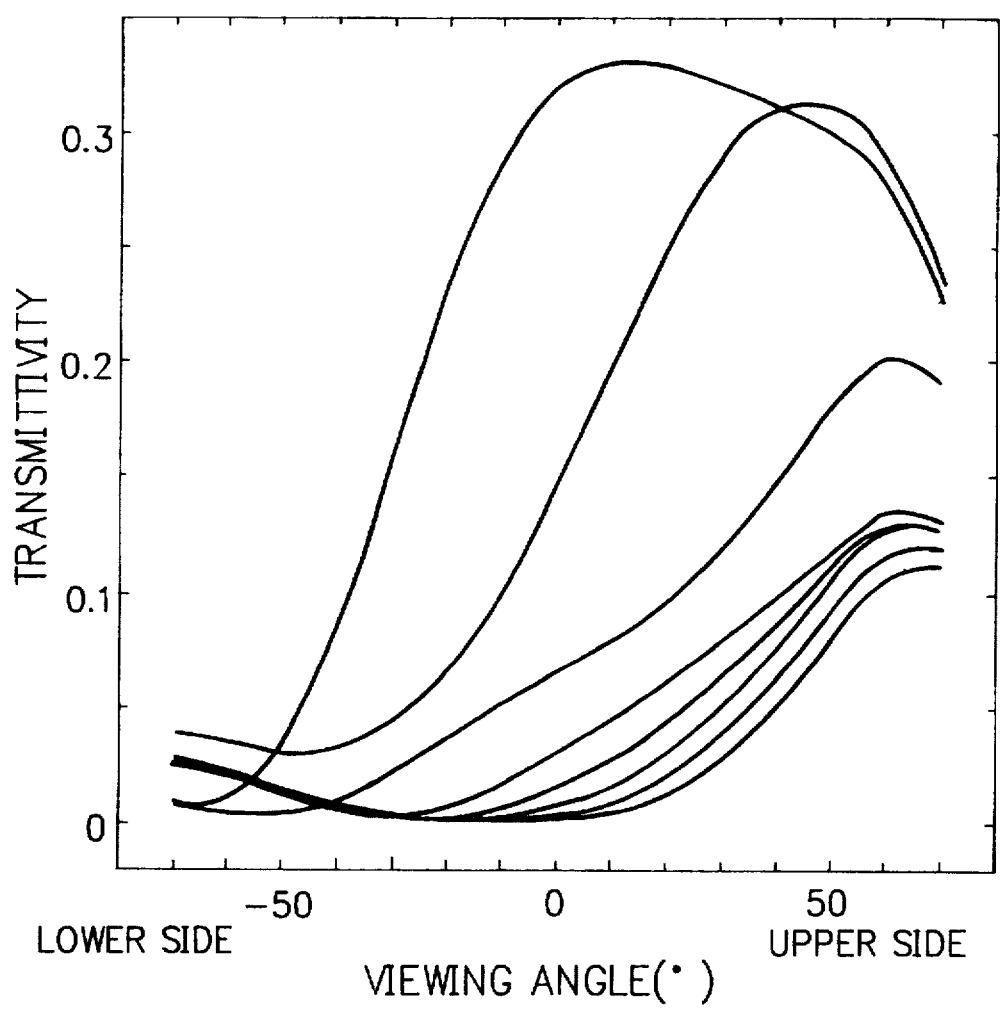
FIG. 12 is a graph showing a viewing-angle-vs-transmittivity characteristic to explain the prior art.

In FIGS. 38A and 38B, the scanning electrode 11 and the connecting capacitor electrode 15 are formed in the same layer, and the first and second pixel electrodes 14 and 16 are capacitively connected to the connecting capacitor electrode 15, which enables mutually different voltages to be applied as potential of the first pixel electrode 14 and as potential of the second pixel electrode. In accordance with the second invention, it is possible to provide a liquid crystal display having a simplified structure as compared with that of the conventional liquid crystal display of the pixel division type (e.g., as shown in FIG. 10). On the respective pixel electrodes, there exist liquid crystal orientation areas having mutually different orientation directions and hence it is possible to prevent inversion of gradation (FIG. 12) which has been a problem in the viewing angle characteristic of a liquid crystal display driven with different potential values set to the respective pixel electrodes. Furthermore, there can be suppressed the deterioration in contrast which takes place when the viewing angle is increased in a liquid crystal display device of the conventional orientation division type in which each pixel includes only liquid crystal display areas having different orientation directions. As a result, the viewing angle characteristic is remarkably improved in the vertical direction.

Figure 41A:
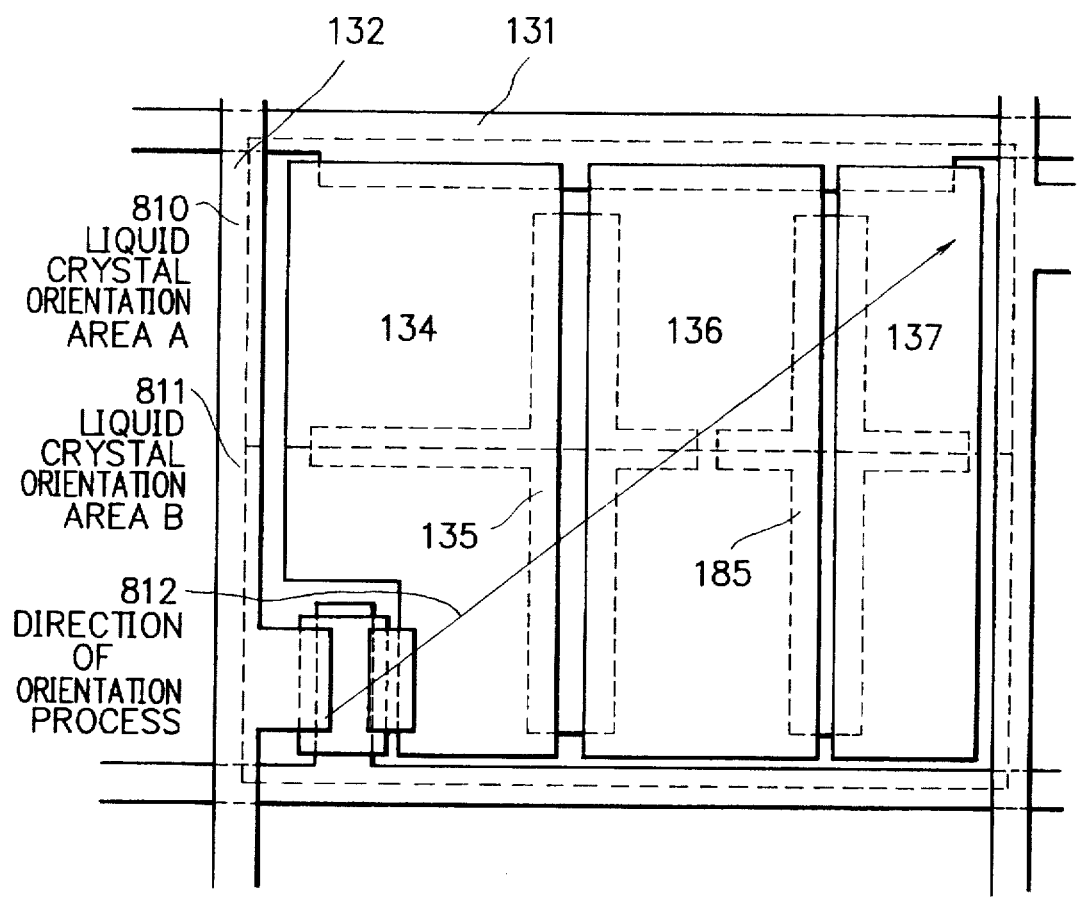
FIG. 41A is a plan view for explaining a fifth embodiment in accordance with the first invention.
Figure 41B:
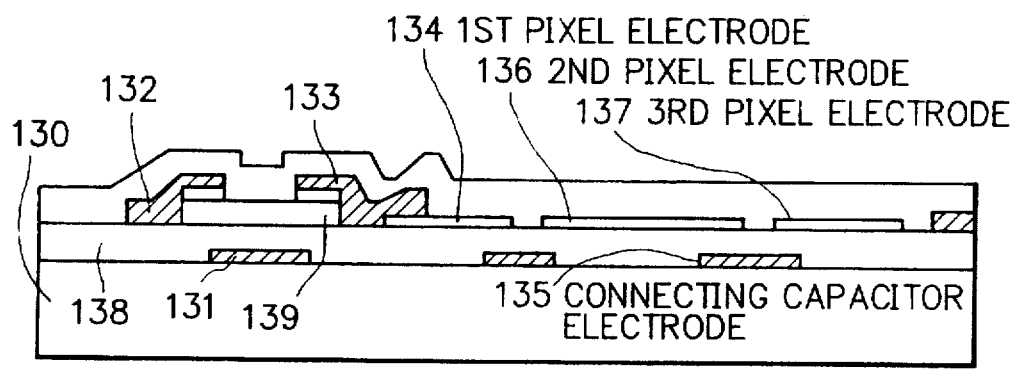
FIG. 41B is a cross-sectional view to explain the fifth embodiment according to the first invention.

FIGS. 41A and 41B are a plan view and a cross-sectional view of a TFT array of a liquid crystal display in which a pixel electrode is subdivided into three partitions according to a fifth embodiment of the first invention. First, on a transparent glass substrate 130, there is sputtered, for example, Ta to form a 2000 angstrom thick layer so as to form scanning electrodes 131, gate electrodes as part of the scanning electrodes 131, and connecting capacitor electrodes 135 in island structure. As materials of the metallic electrodes, there have been known, in addition to Ta, metals such as Al, TaN, and Cr as well as alloys and laminated stacks thereof. The present embodiment is effective for any one of these materials and items. Subsequently, a 5000 angstrom thick gate insulation film 138 and a 3000 angstrom thick amorphous silicon film 139 are fabricated by plasma CVD. An amorphous silicon layer is then formed in island structure and then a 500 angstrom thick indium oxide tin for transparent electrode is sputtered to form first pixel electrodes 134, second pixel electrodes 136, and third pixel electrodes 137 in island structure. The first to third pixel electrodes are designed to be spatially superimposed onto the connecting capacitor electrodes. The first to third pixel electrodes are designed to be superimposed onto the scanning electrodes of a preceding stage so as to improve stability of operation of the liquid crystal display. In the superimposed structure, it is not necessary that all pixel electrodes are spatially superimposed onto each other. The areas of the first and second pixel electrodes vary depending on display modes of liquid crystal. Subsequently, a 1500 angstrom thick Cr layer is fabricated by sputtering to form signal electrodes 132, source electrodes integral with the signal electrodes 132, and drain electrodes 133 in island structure. The ohmic layer in the amorphous silicon layer is partially etched to complete the thin-film transistors. Finally, a 2000 angstrom thick silicon nitride layer is formed as a protective layer to complete a TFT array substrate.

Although this embodiment is fabricated by use of amorphous silicon thin-film transistors of a channel etch type, the present embodiment is effective for other transistors having another structure, for example, amorphous silicon thin-film transistors of a channel protective layer type as well as for other transistors made of other materials.

Thereafter, a patterning process is conducted as follows. In an area a 810, there is formed an orientation film for which the pre-tilt angle of liquid crystal arranged in the display is 1° or less. In an area b 811, there is fabricated an orientation film for which the pre-tilt angle of liquid crystal arranged in the display is 3° or more. The orientation process is then conducted in a direction 812. On the other hand, for a color filter substrate, a patterning process is effected such that orientation films are formed as follows. In an area thereof corresponding to the area a 810 there is formed an orientation film for which the pre-tilt angle of liquid crystal arranged in the display is 3° or more. In an area thereof corresponding to the area b 811, there is formed an orientation film for which the pre-tilt angle of liquid crystal arranged in the display is 1° or less. Moreover, in the orientation process, the direction of orientation is selected to be shifted by 90° relative to that of the associated area on the TFT substrate. Subsequently, the TFT substrate and the color filter substrate are fixed to each other and the gap therebetween is filled with liquid crystal and is then sealed. The glass substrate is cut, and a driver circuit and a back light unit are connected to the obtained semi-finished product, thereby completing the liquid crystal display.

Figure 42A:
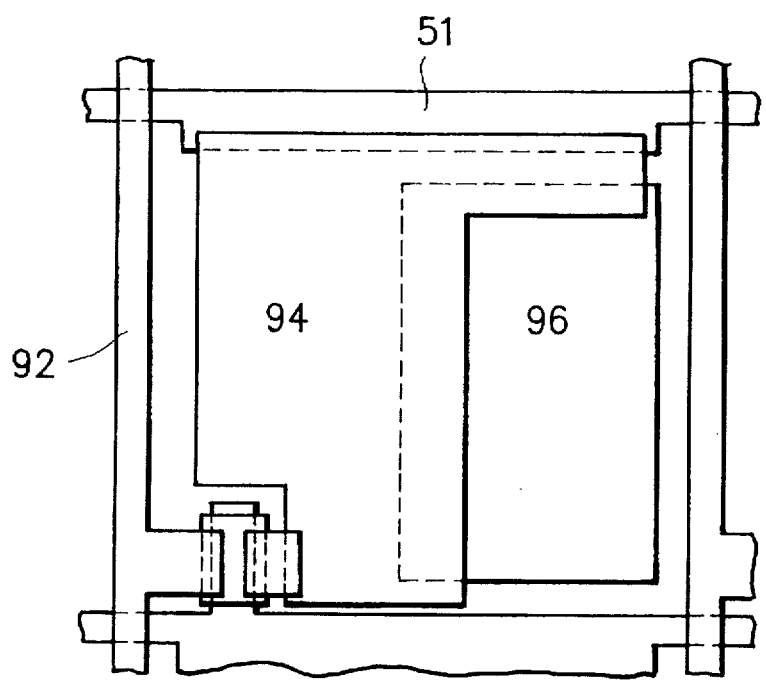
FIG. 42A is a plan view for explaining a fourth embodiment in accordance with the first invention.
Figure 42B:
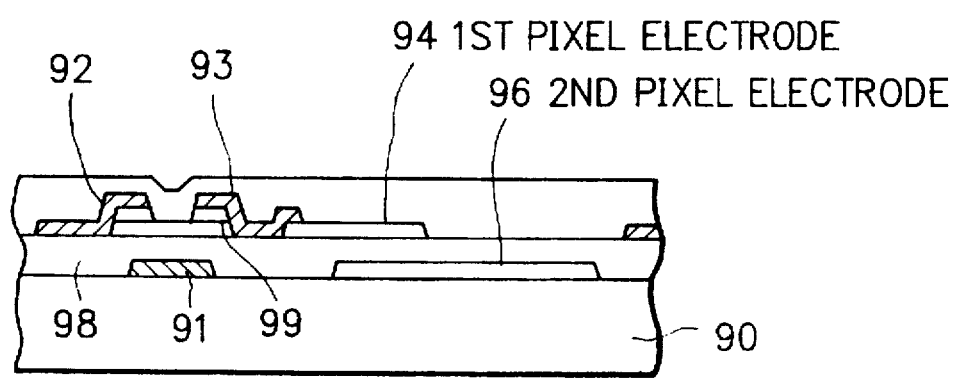
FIG. 42B is a cross-sectional view to explain the fourth embodiment according to the first invention.

FIGS. 42A and 42B are a plan view and a cross-sectional view of a TFT array according to a fourth embodiment according to the first invention. First, on a transparent glass substrate 90, there is sputtered, for example, Cr to form a 1000 angstrom thick layer so as to form scanning electrodes 51 and gate electrodes 91. Subsequently, a 500 angstrom thick Indium tin oxide layer is formed by sputtering to form connecting capacitor electrodes also functioning as second pixel electrodes 96 in island structure. As materials of the metallic electrodes, there have been known, in addition to Cr, metals such as Al and TaN as well as alloys and laminated stacks thereof. The present embodiment is effectively applicable to any one of these materials and items. Moreover, the present embodiment is effectively applicable to any cases, for example, a case where the connecting capacitor electrode partially includes metallic films or a case where a transparent electrode is laminated onto scanning and gate electrodes. Next, a 4000 angstrom thick gate insulation film 98 and a 3000 angstrom thick amorphous silicon film 99 are fabricated by plasma CVD.

An amorphous silicon layer is then formed in island structure and then a 500 angstrom indium tin oxide for transparent electrode is sputtered to form first pixel electrodes 94 in island structure. In the process, the first and second pixel electrodes are designed to be spatially overlapped with each other.

In addition, the first and second pixel electrodes are designed to be superimposed onto the scanning electrodes of the preceding stage so as to thereby improve stability of operation of the liquid crystal display. In the overlapped structure, the pixel electrodes need not be necessarily overlapped with each other along the length. The areas of the first and second pixel electrodes alter according to display modes of liquid crystal. Subsequently, a 1500 angstrom thick Cr layer is manufactured by sputtering to form signal electrodes 92, source electrodes integral with the signal electrodes 92, and drain electrodes 93 in island structure. Partially etching the ohmic layer in the amorphous silicon layer to complete the thin-film transistors. Finally, there is formed a 2000 angstrom thick silicon nitride layer as a protective layer to complete a TFT array substrate. Thereafter, the semi-finished substrate undergoes an orientation process to be fixed onto the color filter substrate. The gap therebetween is filled with liquid crystal and is then sealed. After a cutting of the glass substrate, a driving circuit and a back light unit are connected to the semi-finished product, thereby completing the liquid crystal display. The viewing angle characteristic of the display is almost equivalent to that shown in FIG. 21, namely, is better than that of the liquid crystal display of the conventional structure.

Figure 43A:
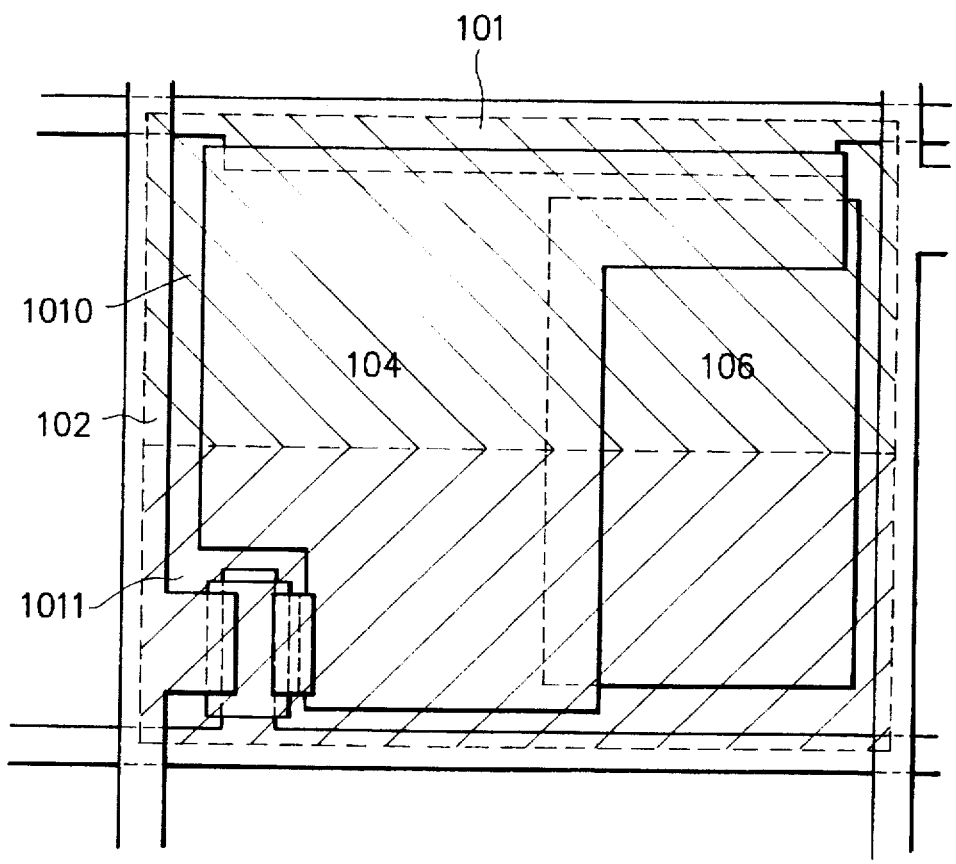
FIG. 43A is a plan view for explaining a second embodiment in accordance with the second invention.
Figure 43B:
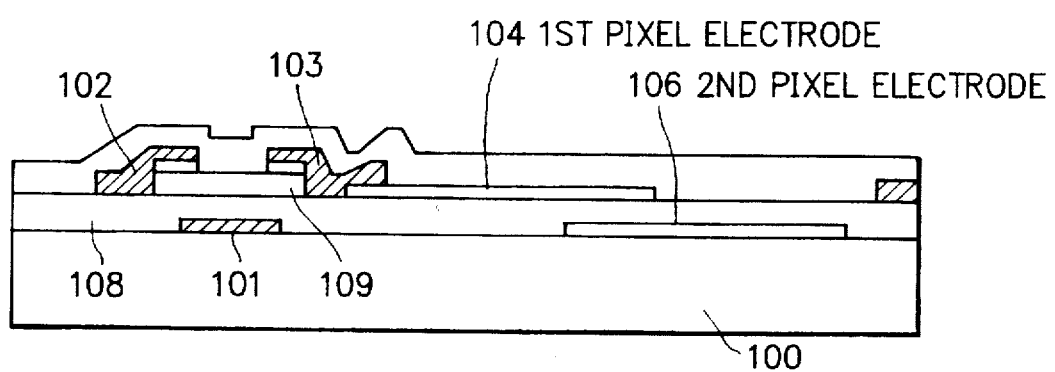
FIG. 43B is a cross-sectional view to explain the second embodiment according to the second invention.

FIGS. 43A and 43B are a plan view and a cross-sectional view of a TFT array according to a second embodiment according to the second invention, which differs from the embodiment shown in FIG. 42 in that the former is implemented without using the orientation process. In short, skipping the orientation process, the TFT array substrate is fixed onto the color filter substrate such that the gap therebetween is filled with liquid crystal and is then sealed. After the glass substrate is removed, a driving circuit and a back light unit are connected to the semi-finished product so as to thereby complete the liquid crystal display. In this case, on first and second pixel electrodes 104 and 106 electrodes of each pixel, there are obtained many orientation areas having mutually different directions of orientation of liquid crystal. In FIGS. 43A and 43B, designated by reference character 100 is a glass substrate, 101 is a scanning electrode including a gate electrode, 102 is a signal electrode integral with a source electrode, 103 is a drain electrode, 18 is a gate insulating layer, 109 is a semiconductor film, 1010 is a liquid crystal orientation area a, and 1011 is a liquid crystal orientation area b. Although the viewing angle characteristic of the display is improved, there is observed deterioration in contrast. In a case like in the preceding embodiment where different directions of liquid crystal orientation are provided for the respective pixel electrodes, the deterioration of contrast is prevented and the viewing angle characteristic is remarkably improved.

Figure 1B:
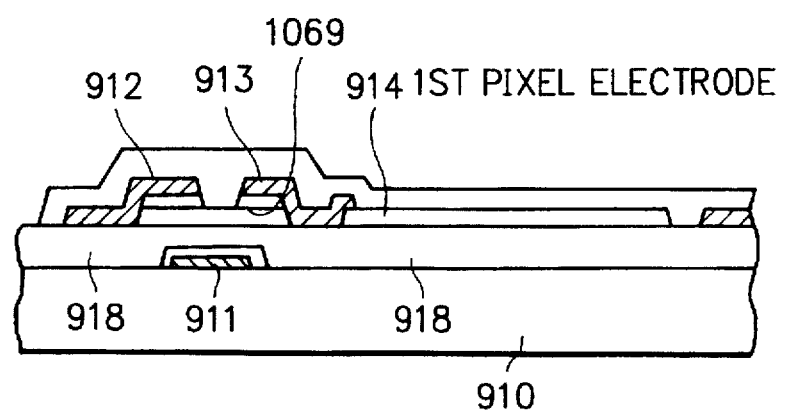
FIG. 1B is a cross-sectional view along line A–A' of FIG. 1A.

As above, in accordance with the present invention, the scanning electrodes, gate electrodes, storage capacity electrodes, and connecting capacitor electrodes can be simultaneously manufactured, which is impossible for the thin-film transistor array structure used in the conventional liquid crystal display shown in FIGS. 1A and 1B. As for the viewing angle characteristic, when compared with that of the conventional structure of FIG. 2, the viewing angle range is improved from 30° to 55° by this structure. Moreover, the structure is simple as compared with structure which may be inferred from the thin-film transistor array of a liquid crystal display (FIG. 3) having an improved viewing angle characteristic, and the viewing angle characteristic can be retained. To introduce this structure to the system, it is unnecessary to increase the storage capacity and the number of processes. Consequently, in accordance with the present invention, there is advantageously provided a low-cost and stable liquid crystal display having a satisfactory viewing angle characteristic.

Figure 2:
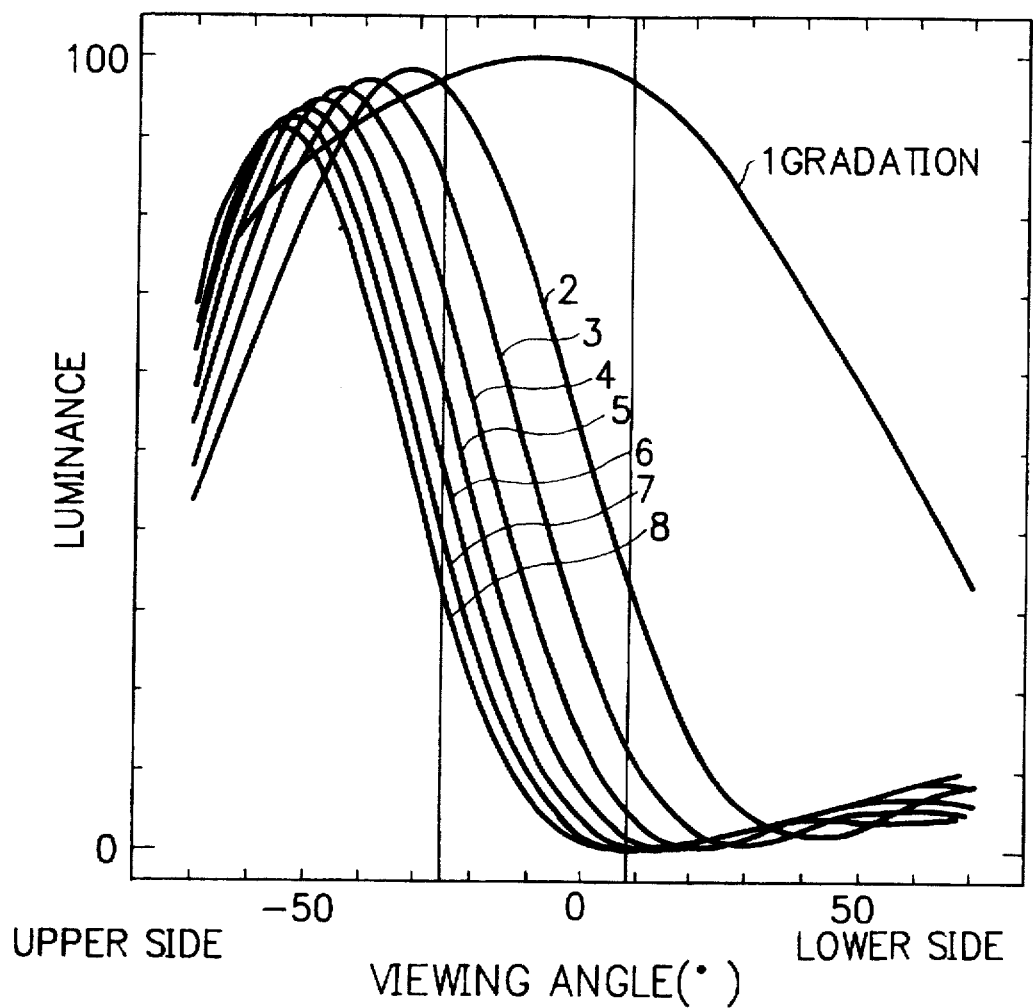
FIG. 2 is a graph showing a viewing angle characteristic of a liquid crystal display of the prior art.
Figure 3:
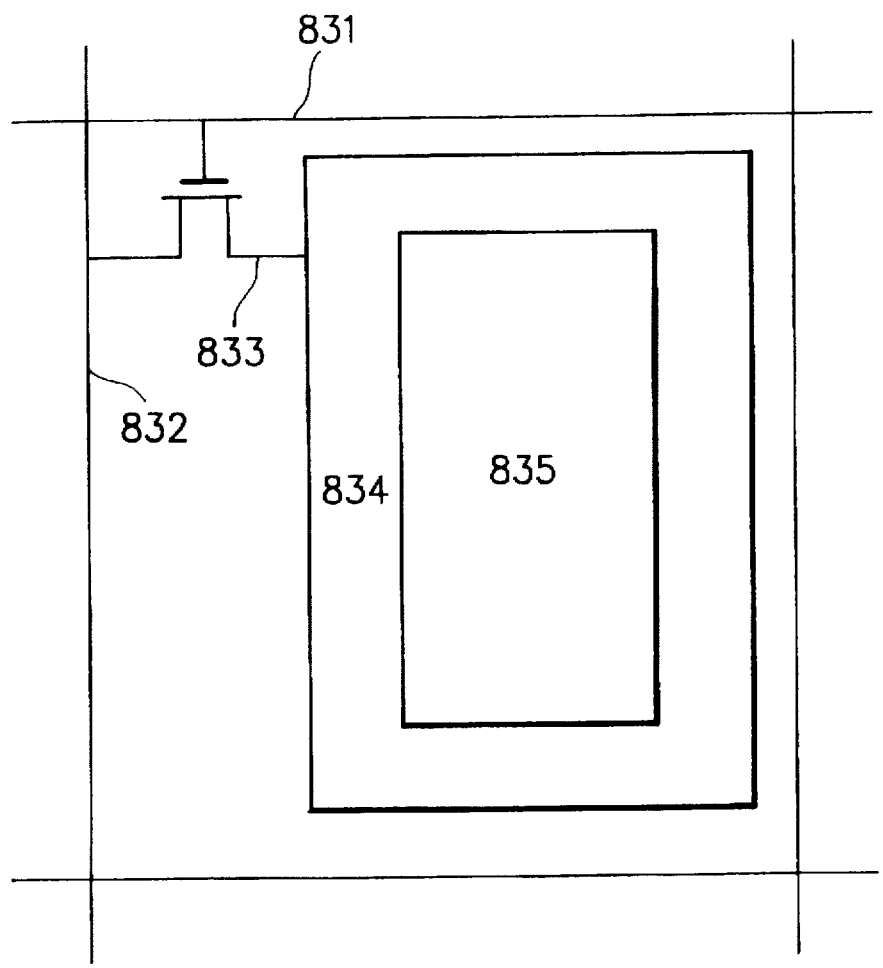
FIG. 3 is a plan viewing showing a thin-film transistor array of a conventional liquid crystal display having an improved viewing angle characteristic.
Figure 4:
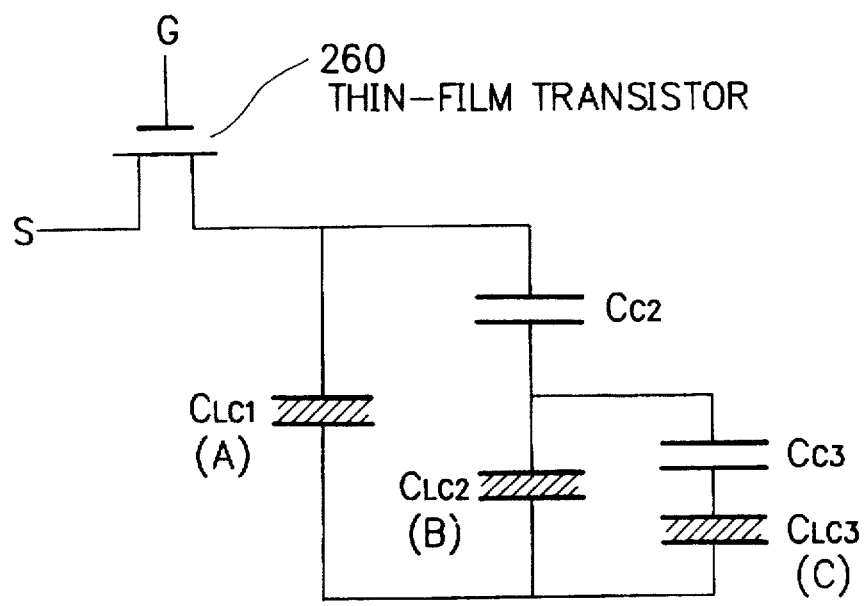
FIG. 4 is a circuit diagram of a pixel for explaining the conventional technology.
Figure 5:
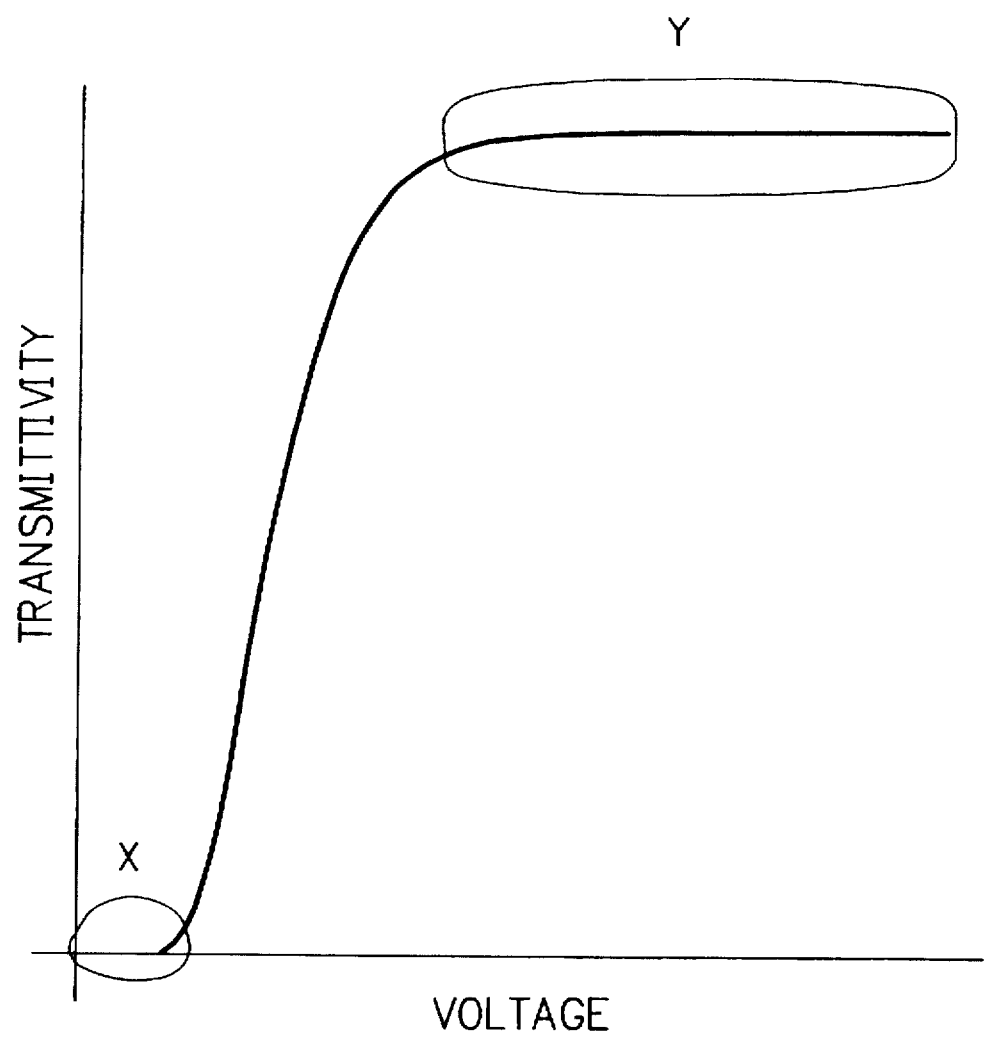
FIG. 5 is a graph showing a transmittivity-vs-voltage characteristic to explain the prior art.
Figure 6:
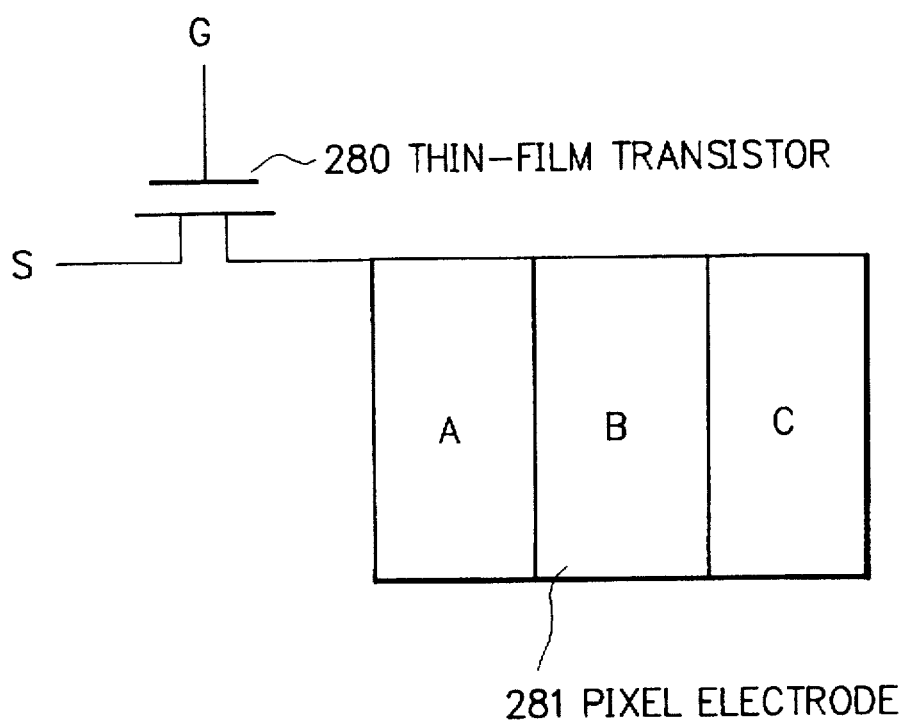
FIG. 6 is a schematic circuit diagram for explaining the prior art.
Figure 7:
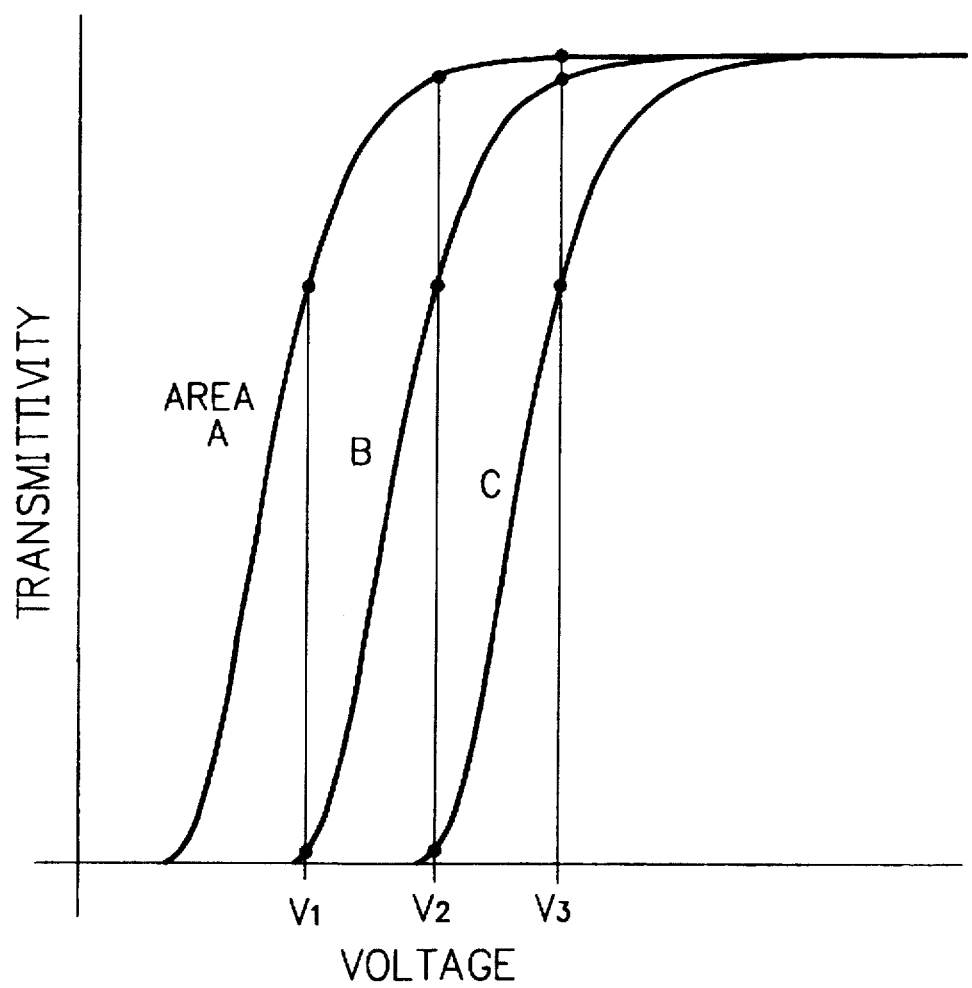
FIG. 7 is a graph showing a transmittivity-vs-voltage characteristic for explaining the prior art.
Figure 13:
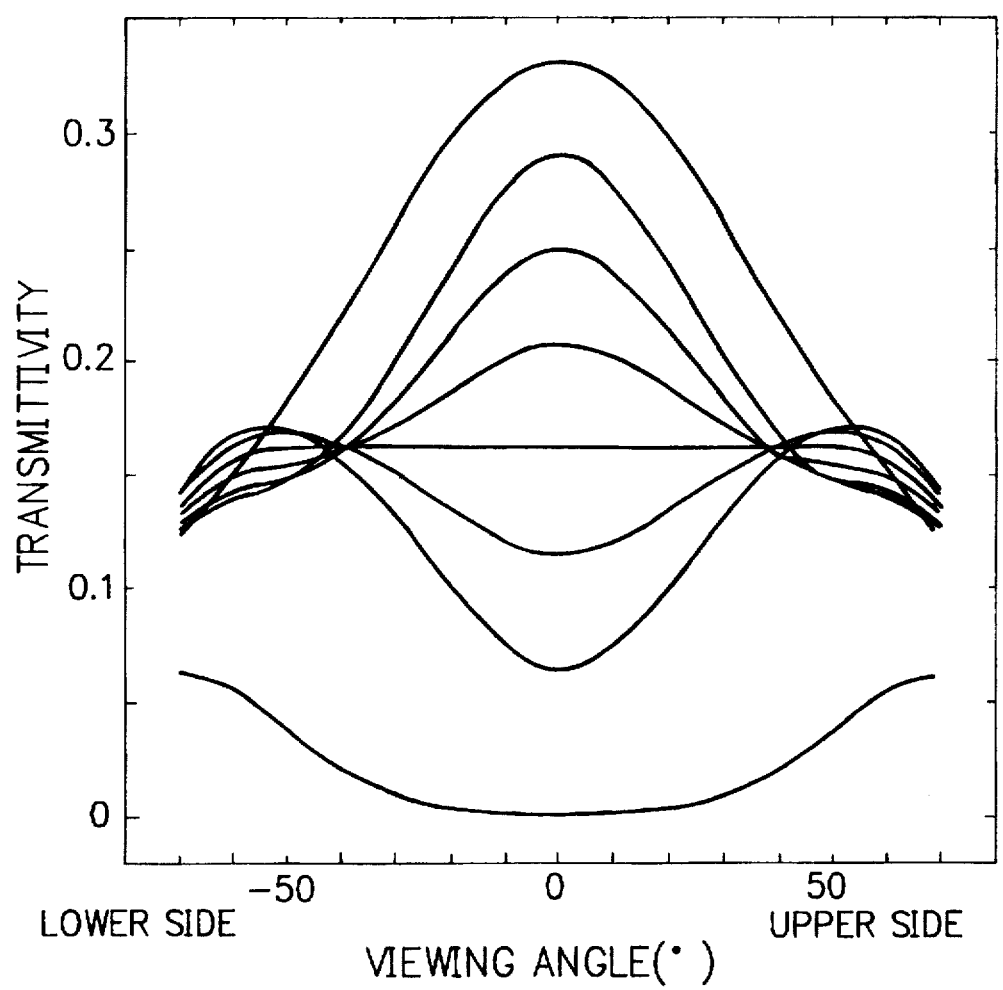
FIG. 13 is a graph showing a viewing-angle-vs-transmittivity characteristic for explaining the conventional technology.

Since scanning and connecting electrodes are formed in the same layer and first and second pixel electrodes are capacitively connected to connecting capacitance, mutually different voltages can be applied as potential of first pixel electrodes and as potential of second pixel electrodes. There can be provided a liquid crystal display having a simplified structure when compared with structure of the conventional liquid crystal display of the pixel division type of FIG. 13 having an improved viewing angle characteristic. Furthermore, since areas having mutually different directions of liquid crystal orientation are disposed on the respective pixel electrodes, there is prevented inversion of gradation as shown in FIG. 2, which is a problem in the viewing angle characteristic of a liquid crystal display when driven by mutually different values of pixel electrode potential. In addition, there does not occur deterioration in contrast taking place when a viewing angle is increased in a liquid crystal device of the conventional orientation division type (FIG. 19) of which each pixel includes only liquid crystal display areas having mutually different directions of orientation. As a result, the viewing angle characteristic in the vertical direction is not attended with occurrence of inversion of gradation related to the liquid crystal display of the conventional pixel division type, namely, there is attained a viewing angle of 55° for contrast 5:1 or more as shown in FIG. 40. When compared with the viewing range 60° of the liquid crystal display of the conventional orientation division type, the viewing angle range is remarkably increased to 80° as shown in the viewing angle characteristic shown in FIG. 40. This indicates advantages of the present invention.

In accordance with embodiments of the present invention, there can be attained wide viewing angle dependence having high visibility. As described in conjunction with associated embodiments, the present invention can be efficiently used in liquid crystal modes other than the TN mode. Moreover, the present invention can be effectively applied to a liquid crystal panel including an optical compensation plate or the like.

While the present invention has been described with reference to the particular illustrative embodiments, it is not to be restricted by those embodiment but only by the appended claims. It is to be appreciated that those skilled in the art can change or modify the embodiments without departing from the scope and spirit of the present invention.

What is claimed is:

1. A liquid crystal display, comprising:

scanning electrodes and signal electrodes arranged in a matrix on a transparent insulator substrate;

thin-film transistors disposed at respective intersections between the scanning electrodes and the signal electrodes;

first pixel electrodes connected to respective signal electrodes via the thin-film transistors;

connecting capacitor electrodes, arranged on the transparent insulator substrate, and connected to respective first pixel electrodes;

a gate insulator film extending over the connecting capacitor electrodes;

at least one second pixel electrode capacitively connected to the first pixel electrodes via the connecting capacitor electrodes;

an opposing electrode opposing the first pixel electrodes; and a liquid crystal layer interposed between the first pixel electrodes and the opposing electrode;

wherein:
the connecting capacitor electrodes are formed to apply mutually different voltages to the first and second pixel electrodes; and
the first and second pixel electrodes are disposed on the gate insulator film.

2. The liquid crystal display of claim 1, further comprising:

a plurality of liquid crystal orientation areas having mutually different directions of orientation.

3. A liquid crystal display as claimed in claim 1, wherein:

an area formed on a substrate including the pixel electrodes includes two areas A and B which have undergone an orientation process in rubbing directions which are different from each other by 180°; and the opposing electrode is arranged on an opposing substrate including two areas a and b which have undergone an orientation process in rubbing directions different from each other by 180° and which are substantially perpendicular to the rubbing directions concerning the two areas A and B.

4. The liquid crystal display of claim 1, wherein:

the connecting capacitor electrodes and the scanning electrodes are formed in a same process step.

5. The liquid crystal display of claim 1, wherein:

the scanning electrodes and a storage capacitor electrode are arranged on the insulator substrate.

6. A liquid crystal display, comprising:

display pixels, each of the display pixels including:
 a) n areas (wherein n is a natural number equal to or more than two) having mutually different directions of orientation of liquid crystal; and
 a) m areas (wherein m is a natural number equal to or more than two) being applied with mutually different voltages;

wherein orientation direction of the areas a and b is substantially perpendicular to a boundary between a pixel electrode and an oxide film provided on the pixel electrode.

7. A liquid crystal display, comprising:

display pixels; and a display substrate;

wherein each of the pixels includes m areas (wherein m is a natural number equal to or more than two) being applied with mutually different voltages and n areas (wherein n is a natural number equal to or more than two); and wherein directions of division of the m areas and directions of division of the n areas are substantially perpendicular to each other.

8. A liquid crystal display, comprising:

an insulator substrate;

a connecting capacitor electrode arranged on the insulator substrate;

a gate insulator film extending over the connecting capacitor electrode;

a scanning electrode and a signal electrode, arranged on the insulator substrate to cross each other at a cross point;

a thin-film transistor disposed in a vicinity of the cross point of the scanning electrode and the signal electrode;

a first pixel electrode disposed on the gate insulator film and connected to the signal electrode via the thin-film transistor;

a second pixel electrode, disposed on the gate insulator film and capacitively connected by the connecting capacitor electrode to the first pixel electrode so that the first and second pixel electrodes can be applied with mutually different signal voltages;

an orientation film disposed on the first and second pixel electrodes and divided into an area "a" and an area "b", wherein area "a" and area "b" have mutually different orientations;

an opposing electrode which opposes the first pixel electrode; and a liquid crystal layer interposed between the first pixel electrode and the opposing electrode.

9. The liquid crystal display of claim 8, wherein:

the areas "a" and "b" have a boundary portion therebetween which crosses a boundary portion between the first and second pixel electrodes.

10. The liquid crystal display of claim 8, wherein:

the areas "a" and "b" extend parallel to the scanning electrode and are arranged on both sides of the scanning electrode.

* * * * *